US012609238B2

(12) United States Patent
Ishii et al.

(10) Patent No.: US 12,609,238 B2
(45) Date of Patent: Apr. 21, 2026

(54) COIL DEVICE

(71) Applicant: TDK CORPORATION, Tokyo (JP)

(72) Inventors: Takashi Ishii, Tsuruoka-city (JP); Takashi Kudo, Tokyo (JP); Hirofumi Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1006 days.

(21) Appl. No.: 17/701,920

(22) Filed: Mar. 23, 2022

(65) Prior Publication Data

US 2022/0328242 A1 Oct. 13, 2022

(30) Foreign Application Priority Data

Apr. 7, 2021 (JP) ................................ 2021-065381

(51) Int. Cl.

| | |
|---|---|
| ***H01F 27/29*** | (2006.01) |
| ***H01F 27/24*** | (2006.01) |
| ***H01F 27/28*** | (2006.01) |
| ***H01F 27/30*** | (2006.01) |
| *H01F 41/064* | (2016.01) |

(52) U.S. Cl.

CPC ........... *H01F 27/306* (2013.01); *H01F 27/24* (2013.01); *H01F 27/2823* (2013.01); *H01F 27/29* (2013.01); *H01F 41/064* (2016.01)

(58) Field of Classification Search

CPC .... H01F 27/306; H01F 27/24; H01F 27/2823; H01F 27/29; H01F 41/064; H01F 17/045; H01F 27/2828; H01F 27/292; H01F 27/263; H01F 3/14; H01F 17/04; H01F 27/34

See application file for complete search history.

(56) References Cited

U.S. PATENT DOCUMENTS

| | | | | |
|---|---|---|---|---|
| 6,154,112 A * | 11/2000 | Aoba | .................... | H01F 27/292 336/200 |
| 6,242,996 B1 * | 6/2001 | Sato | ...................... | H01F 17/045 336/200 |
| 9,984,809 B2 * | 5/2018 | Wakamori | .......... | H01F 41/0246 |
| 2003/0179062 A1 * | 9/2003 | Kuwata | ................. | H01F 17/045 336/83 |
| 2007/0188286 A1 * | 8/2007 | Yoshimoto | ............ | H01F 17/045 336/192 |

(Continued)

FOREIGN PATENT DOCUMENTS

| | | |
|---|---|---|
| CN | 104392827 A | 3/2015 |
| JP | 2003-332822 A | 11/2003 |
| JP | 2006-135291 A | 5/2006 |

*Primary Examiner* — Mang Tin Bik Lian
(74) *Attorney, Agent, or Firm* — Oliff PLC

(57) ABSTRACT

A coil device includes: an inner core including a winding core portion wound by a wire, an upper flange portion with a first end portion on one side of the winding core portion, and a lower flange portion with a second end portion on the other side of the winding core portion; an outer core having an insertion hole and disposed outside the inner core, the inner core being inserted to the insertion hole; and a pair of terminal portions on the outer core, lead portions of the wire connect to the terminal portions. The number of wire turns along a radial direction of the winding core portion is larger on one side of the winding core portion than on the other side, and a wire winding end position is at the first end portion on the one side of the winding core portion with a wire winding start position.

11 Claims, 27 Drawing Sheets

(56) References Cited

U.S. PATENT DOCUMENTS

| | | | | |
|---|---|---|---|---|
| 2008/0290975 | A1* | 11/2008 | Watanabe | H01F 17/045 336/90 |
| 2009/0071454 | A1* | 3/2009 | Fujiyama | H01F 38/12 123/634 |
| 2010/0134233 | A1* | 6/2010 | Wang | H01F 3/08 29/606 |
| 2011/0309906 | A1* | 12/2011 | Muneuchi | H01F 17/045 29/605 |
| 2013/0027161 | A1* | 1/2013 | Urano | H01F 17/04 336/83 |
| 2014/0002227 | A1* | 1/2014 | Hsieh | H01F 5/003 336/200 |
| 2016/0118184 | A1* | 4/2016 | Ukai | H01F 17/045 336/192 |
| 2016/0217919 | A1* | 7/2016 | Iwata | H01F 27/29 |
| 2017/0186531 | A1* | 6/2017 | Ohtsubo | H01F 41/0246 |
| 2017/0263372 | A1* | 9/2017 | Ashizawa | H01F 17/045 |
| 2017/0309392 | A1* | 10/2017 | Kobayashi | H01F 27/2823 |
| 2018/0158597 | A1* | 6/2018 | Chiu | H01F 27/306 |
| 2019/0304659 | A1* | 10/2019 | Tonogai | H01F 27/2823 |

* cited by examiner

COIL DEVICE

BACKGROUND OF THE INVENTION

1. Field of the Invention

The present invention relates to a coil device.

2. Description of the Related Art

A coil device that has an inner core wound by a wire and an outer core disposed outside the inner core is known as illustrated in, for example, JP 2006-135291 A. In the coil device described in JP 2006-135291 A, the outer core and the inner core are fixed at a predetermined interval and are mounted on a substrate via a terminal portion provided on the outer core.

In this type of coil device, squealing may arise after mounting a substrate due to the magnetic attraction between the inner core and the outer core. In particular, the inner core being inclined with respect to the outer core with the inner core accommodated in the outer core leads to a local decrease in the distance between the inner core and the outer core, and then the magnetic attraction between the inner core and the outer core becomes stronger and squealing may become noticeable.

SUMMARY OF THE INVENTION

The present invention has been made in view of such a problem, and an object of the present invention is to provide a coil device capable of reducing squealing.

In order to achieve the above object, a coil device according to the present invention includes:

an inner core including a winding core portion wound by a wire, a first flange portion provided in a first end portion on one side in an axial direction of the winding core portion, and a second flange portion provided in a second end portion on the other side in the axial direction of the winding core portion;

an outer core having an insertion hole and disposed outside the inner core, the inner core being inserted to the insertion hole; and a pair of terminal portions provided on the outer core, lead portions of the wire being respectively connected to the terminal portions, in which the number of turns of the wire along a radial direction of the winding core portion is larger on the one side in the axial direction of the winding core portion than on the other side in the axial direction of the winding core portion, and a winding end position of the wire is positioned at the first end portion on the one side in the axial direction of the winding core portion together with a winding start position of the wire.

In the coil device according to the present invention, the winding end position of the wire is positioned at the first end portion on one side in the axial direction of the winding core portion together with the winding start position of the wire. Accordingly, after the wire is wound around the winding core portion, the lead portion can be connected to the terminal portion in a state where the lead portion is pulled out from the winding end position of the wire in a direction orthogonal to the axial direction of the winding core portion. In a case where, for example, the winding end position of the wire is positioned at a position separated to the other side of the winding core portion from the first end portion, it is necessary to diagonally pull out the lead portion toward the terminal portion in order to connect the lead portion to the terminal portion. However, in this case, the problem of the lead portion coming into contact with the upper end portion of the outer core and the inner core wound by the wire being inclined with respect to the outer core may arise. On the other hand, in the coil device according to the present invention, the lead portion is pulled out in a direction orthogonal to the axial direction of the winding core portion, and thus the occurrence of such a problem can be prevented, the distance between the inner core and the outer core can be kept constant, and squealing can be reduced.

The inner core being inclined with respect to the outer core may lead to a decrease in the inductance value of the coil device. With the coil device according to the present invention, the occurrence of such a problem can be prevented and the coil device that is satisfactory in terms of inductance characteristics can be realized.

In the coil device according to the present invention, the number of turns of the wire along the radial direction of the winding core portion is larger on one side in the axial direction of the winding core portion than on the other side in the axial direction of the winding core portion. Accordingly, one side in the axial direction of the winding core portion can be stabilized when the coil device is mounted on a substrate, vibration of the substrate or the like can be suppressed, and squealing can be reduced.

In the present invention, the following effects can be obtained in the process of manufacturing the coil device. In a case where the lead portion is diagonally pulled out toward the terminal portion as described above, the lead portion needs to be bent before the inner core wound by the wire is incorporated into the outer core. On the other hand, in the coil device according to the present invention, the lead portion is pulled out in a direction orthogonal to the axial direction of the winding core portion, and thus the lead portion does not have to be bent and the coil device is easy to assemble.

The wire may be wound in two or more turns along the radial direction of the winding core portion from the one side to the other side in the axial direction of the winding core portion, and the wire may be wound in three or more turns along the radial direction of the winding core portion on the one side in the axial direction of the winding core portion. With such a configuration, the number of turns of the wire along the radial direction of the winding core portion can be locally increased on one side in the axial direction of the winding core portion and vibration of the substrate or the like can be effectively suppressed.

The wire may be wound in two or more turns along the radial direction of the winding core portion from the one side to the other side in the axial direction of the winding core portion, and the wire may not be wound around the second end portion of the winding core portion. In the case of such a configuration, the number of turns of the wire along the radial direction of the winding core portion is locally reduced on the other side in the axial direction of the winding core portion. In other words, the number of turns of the wire along the radial direction of the winding core portion can be relatively increased on one side in the axial direction of the winding core portion and the above effect can be obtained.

Preferably, the wire is started to be wound around the first end portion of the winding core portion at a position adjacent to an inner surface of the first flange portion. With such a configuration, the lead portion can be connected to the terminal portion in a state where the lead portion is pulled out from the winding start position of the wire in a direction orthogonal to the axial direction of the winding core portion. In this case, the inner core wound by the wire is pulled in a direction orthogonal to the axial direction of the winding core portion by the lead portions respectively pulled out from the winding start position and the winding end position, and the posture of the inner core is stabilized by the tension that is received from each of the lead portions. Accordingly, the occurrence of a problem such as the inner core being inclined with respect to the outer core can be effectively prevented and squealing can be effectively reduced.

Preferably, the winding end position of the wire positionally deviates to the other side in the axial direction of the winding core portion with respect to the winding start position of the wire. Even if the wire is started to be wound around the first end portion of the winding core portion at a position in contact with the inner surface of the first flange portion as described above, a gap may be formed during the winding at a position adjacent to the inner surface of the first flange portion. With the above configuration, it is possible to prevent the outermost peripheral turn of the wire positioned at the winding end position from positionally deviating to one side in the axial direction of the winding core portion and falling into the gap in a case where the wire is wound in a plurality of turns along the radial direction of the winding core portion. As a result, unwinding of the wire and the occurrence of a short circuit defect can be effectively prevented.

Preferably, an outer peripheral surface of the first flange portion is joined to an inner peripheral surface of the outer core with a resin, and a gap is formed between an outer peripheral surface of the second flange portion and the inner peripheral surface of the outer core. By joining the outer peripheral surface of the first flange portion to the inner peripheral surface of the outer core with the resin, the inner core or the outer core can be effectively protected from impact or the like. In addition, by forming the gap between the outer peripheral surface of the second flange portion and the inner peripheral surface of the outer core, the coil device that is satisfactory in terms of inductance characteristics (e.g. direct current superimposition characteristics) can be realized.

Under the above configuration in particular, stress concentration in the portion around the gap in the event of vibration of the inner core, the outer core, the substrate, or the like can be prevented, squealing can be effectively reduced, and damage or the like to the inner core and the outer core can be prevented by the number of turns of the wire along the radial direction of the winding core portion being larger on one side in the axial direction of the winding core portion than on the other side in the axial direction of the winding core portion.

DETAILED DESCRIPTION OF THE PREFERRED EMBODIMENTS

Figure 1A:
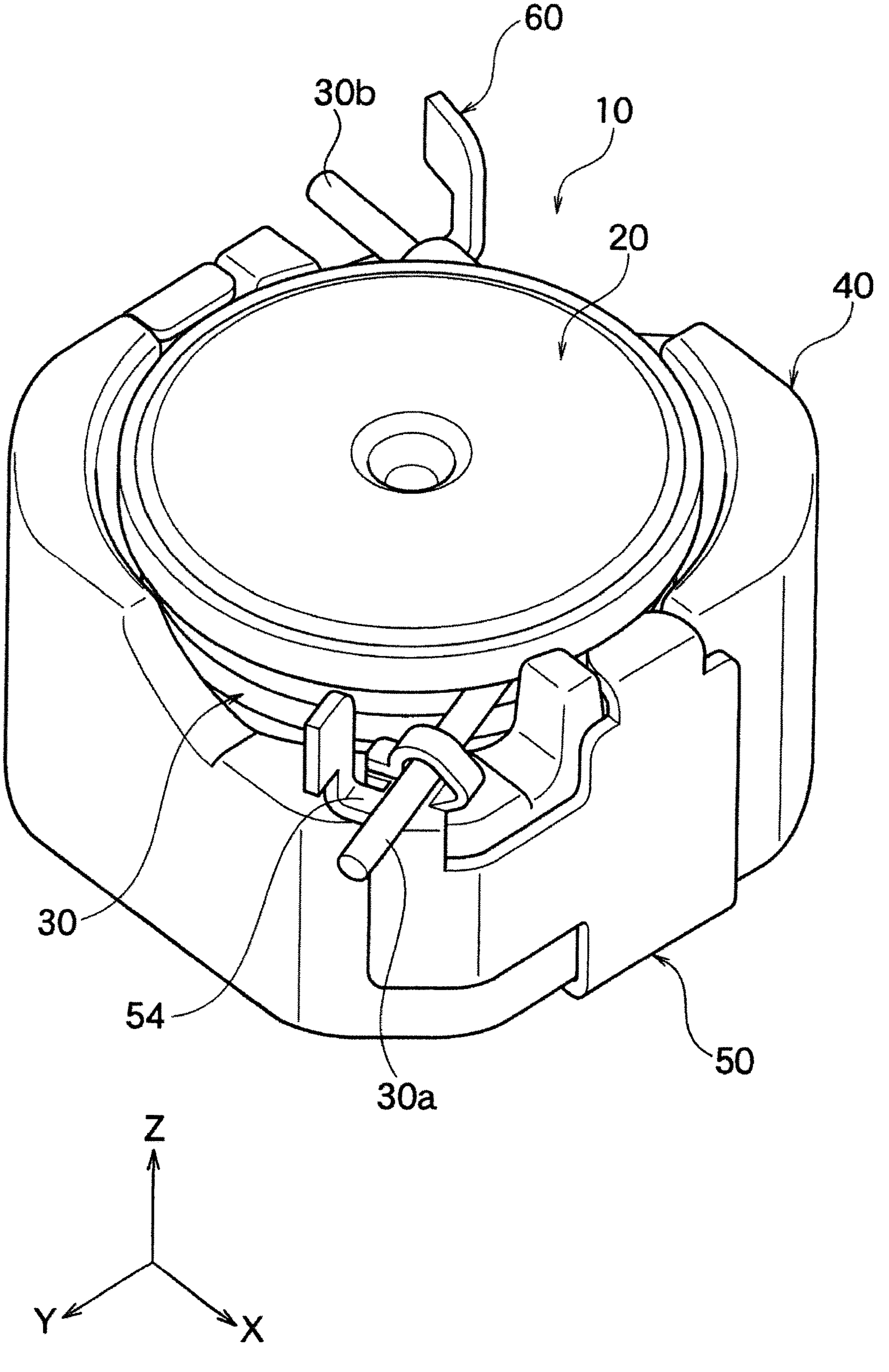
FIG. 1A is an overall perspective view of a coil device according to a first embodiment of the present invention.
Figure 1B:
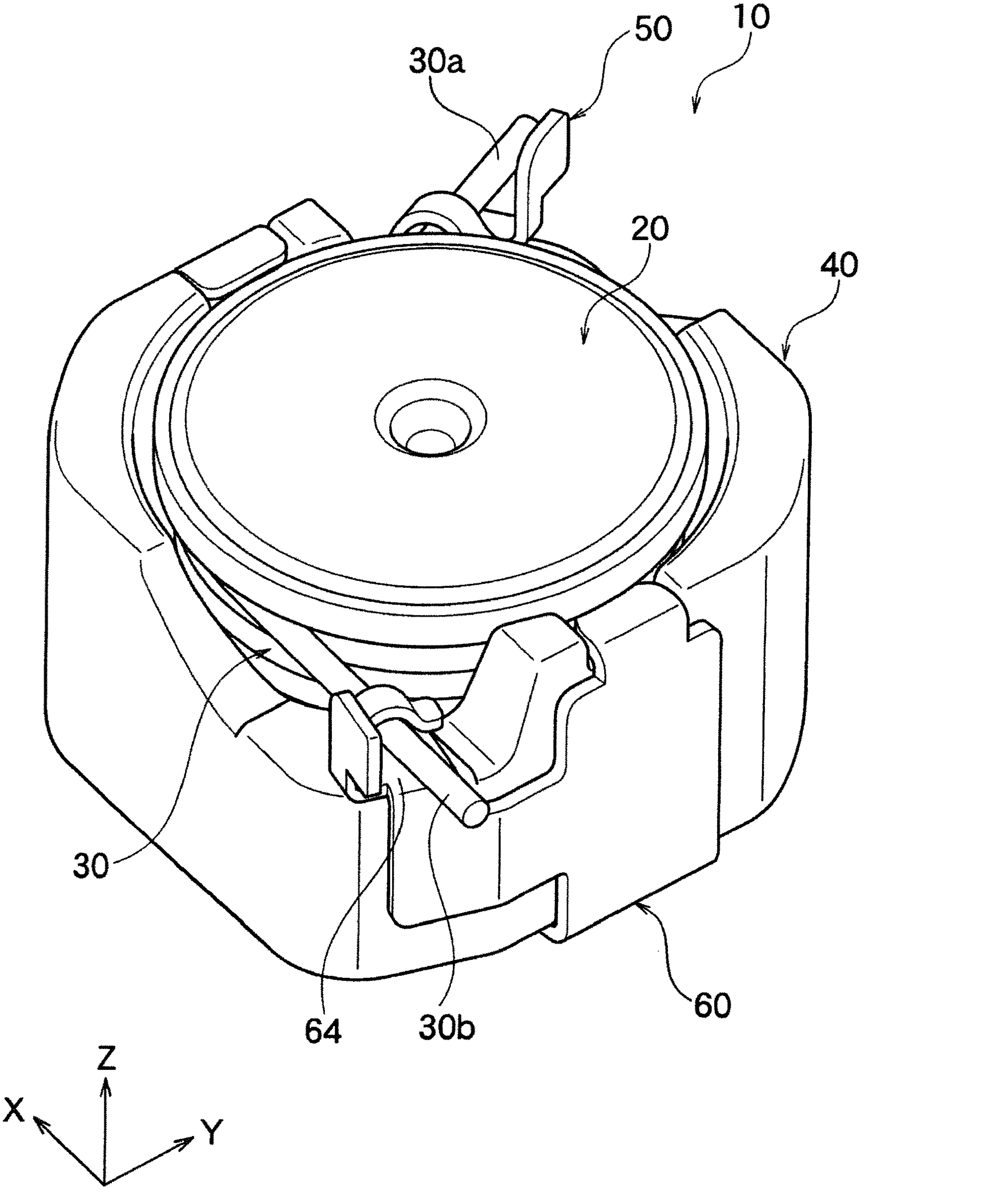
FIG. 1B is an overall perspective view in which the coil device illustrated in FIG. 1A is rotated by 180 degrees around the Z axis as an axis of rotation.

As illustrated in FIGS. 1A and 1B, a coil device 10 according to one embodiment of the present invention is a so-called surface mounting-type coil and has a function as an inductor. As an example, a power source for an electronic device is equipped with the coil device 10. The coil device 10 has a substantially rectangular parallelepiped shape as a whole and has an inner core 20, a wire 30, an outer core 40, a first terminal portion 50, and a second terminal portion 60. The coil device 10 is surface-mounted on a substrate (not illustrated) or the like with the inner core 20 accommodated in the outer core 40. The coil device 10 has an X-axis-direction dimension of 4.0 to 12.0 mm, a Y-axis-direction dimension of 4.0 to 12.0 mm, and a Z-axis-direction dimension of 1.5 to 8.0 mm.

Figure 2:
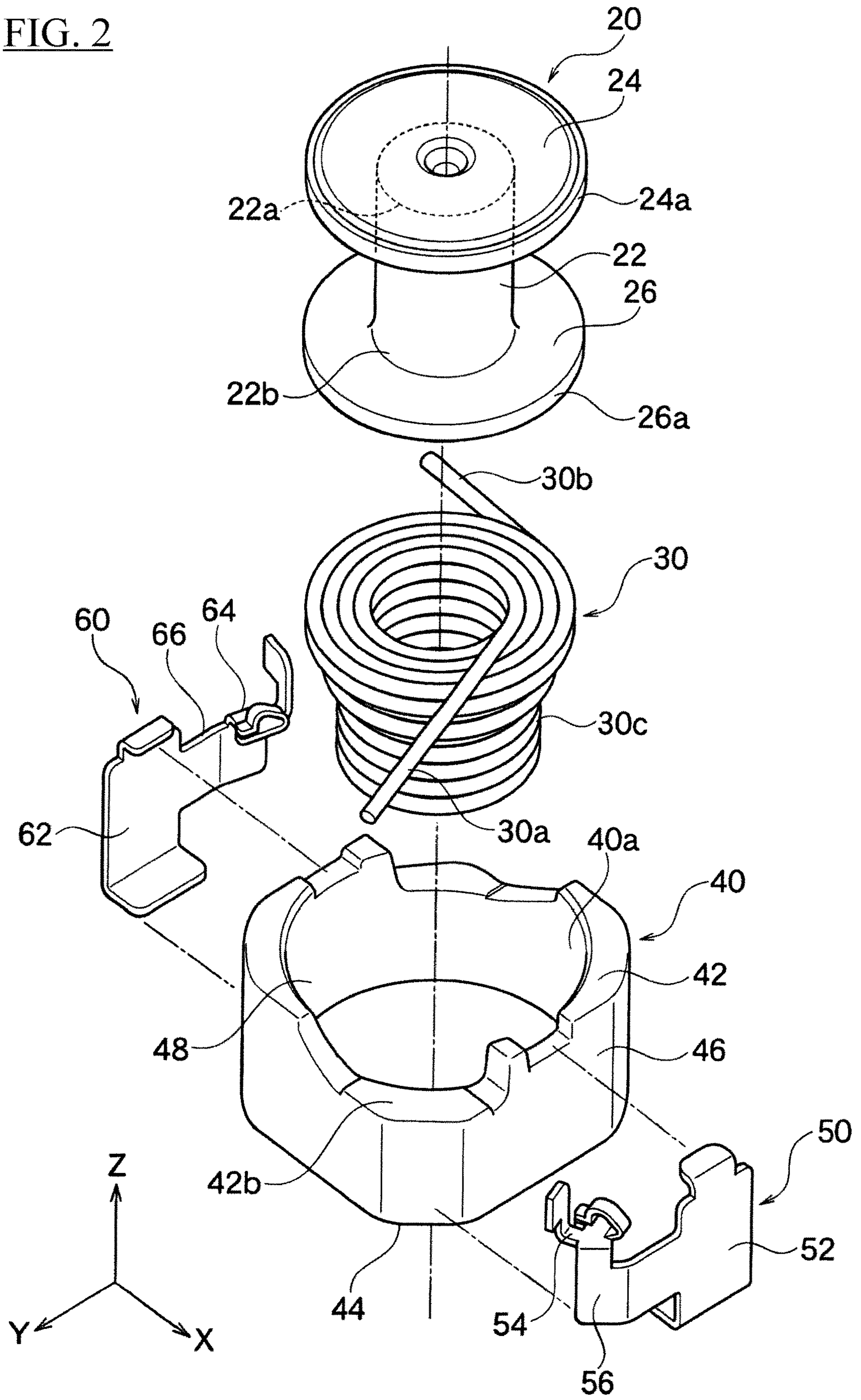
FIG. 2 is an exploded perspective view of the coil device illustrated in FIG. 1A.

As illustrated in FIG. 2, the inner core 20 is a so-called drum core and has a winding core portion 22, an upper flange portion (first flange portion) 24, and a lower flange portion (second flange portion) 26. The inner core 20 is made of a soft magnetic material such as ferrite and metal.

The winding core portion 22 has a substantially columnar shape, and the axial direction of the winding core portion 22 corresponds to the Z-axis direction. When the coil device 10 is mounted, the axial direction of the winding core portion 22 constitutes a normal direction with respect to the mounting surface of the substrate or the like. The wire 30 is wound around the outer peripheral surface of the winding core portion 22, and the axial direction of the winding core portion 22 corresponds to the winding axis direction of the wire 30 (a winding portion 30*c*). The winding portion 30*c* formed by winding the wire 30 around the winding core portion 22 is disposed on the outer peripheral surface of the winding core portion 22. An insulation coating wire is preferably used as the wire 30.

The upper flange portion 24 is provided in a first end portion 22*a* on one side in the axial direction of the winding core portion 22 (Z-axis positive direction side). The upper flange portion 24 has an upper flange portion outer peripheral surface 24*a*. A recessed portion is formed in the central portion of the outer surface (front surface) of the upper flange portion 24. The recessed portion may be omitted. The lower flange portion 26 is provided in a second end portion 22*b* on the other side in the axial direction of the winding core portion 22 (Z-axis negative direction side). The lower flange portion 26 has a lower flange portion outer peripheral surface 26*a*.

The first end portion 22*a* is a position corresponding to the intersection of the winding core portion 22 and the upper flange portion 24 and the portion around the intersection. The first end portion 22*a* also includes a position separated downward by a predetermined distance (e.g. length that is approximately three times the wire diameter of the wire 30) from the intersection. In addition, the second end portion 22*b* is a position corresponding to the intersection of the winding core portion 22 and the lower flange portion 26 and the portion around the intersection. The second end portion 22*b* also includes a position separated upward by a predetermined distance (e.g. length that is approximately three times the wire diameter of the wire 30) from the intersection.

The outer core 40 is a so-called ring core and is disposed outside the inner core 20. The outer core 40 is made of a soft magnetic material such as ferrite and metal. The outer core 40 has an insertion hole 40*a*, a core upper surface 42, a core lower surface 44, a core outer peripheral surface 46, and a core inner peripheral surface 48. The inner core 20 wound by the wire 30 is inserted through the insertion hole 40*a*.

Figure 1C:
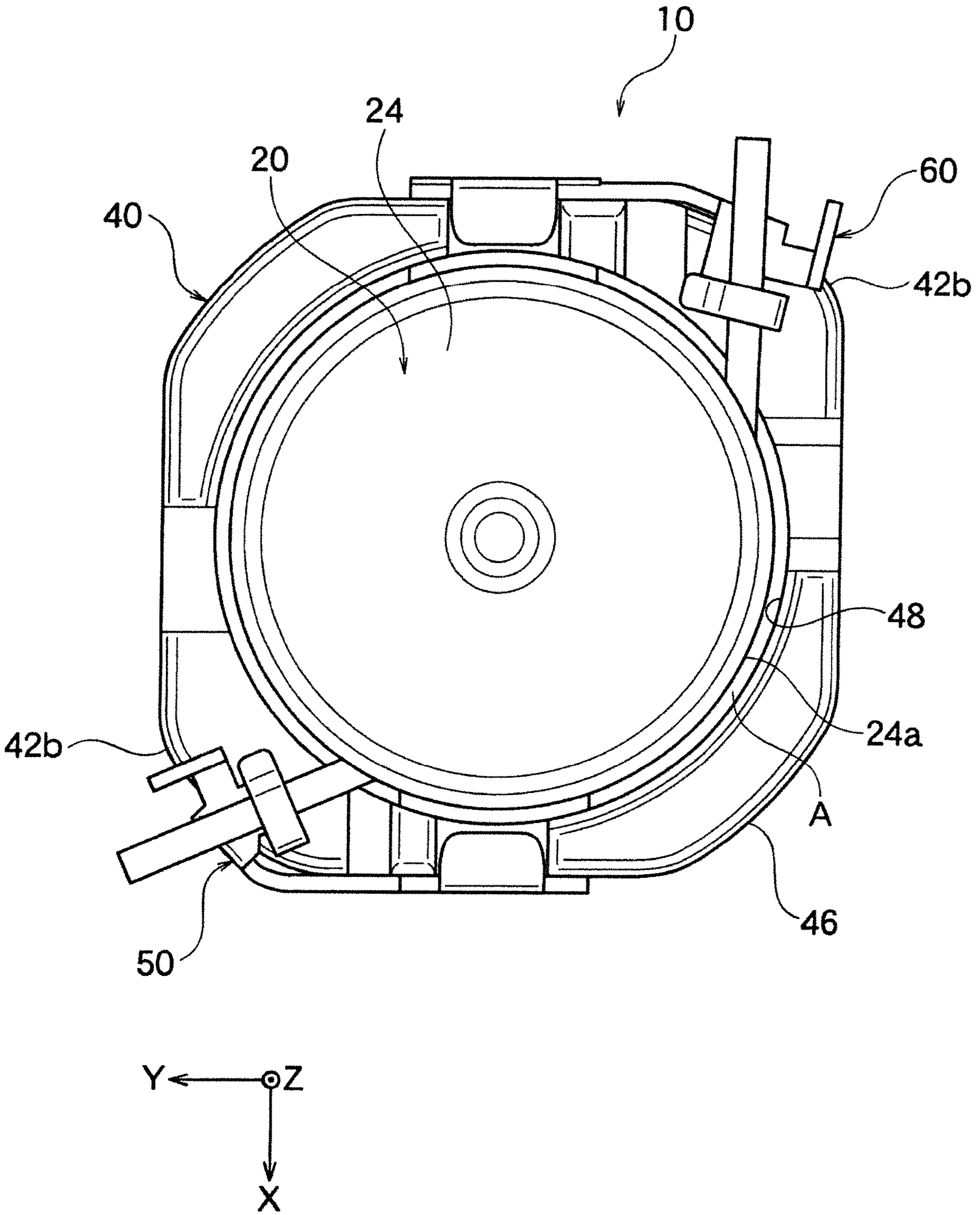
FIG. 1C is a plan view of the coil device illustrated in FIG. 1A.

As illustrated in FIG. 2, the core inner peripheral surface 48 is the inner peripheral surface of the outer core 40 and constitutes the wall surface of the insertion hole 40*a*. In a state where the inner core 20 is accommodated in the insertion hole 40*a*, the core inner peripheral surface 48 faces the upper flange portion outer peripheral surface 24*a* and the lower flange portion outer peripheral surface 26*a*. As illustrated in FIG. 1C, a predetermined gap A is formed between the core inner peripheral surface 48 and the upper flange portion outer peripheral surface 24*a*. Although detailed illustration is omitted, the predetermined gap A is also formed between the core inner peripheral surface 48 and the lower flange portion outer peripheral surface 26*a*. The width of the gap A along the radial direction of the upper flange portion 24 or the lower flange portion 26 is uniform (constant) along the circumferential direction of the upper flange portion 24 or the lower flange portion 26.

Figure 4:
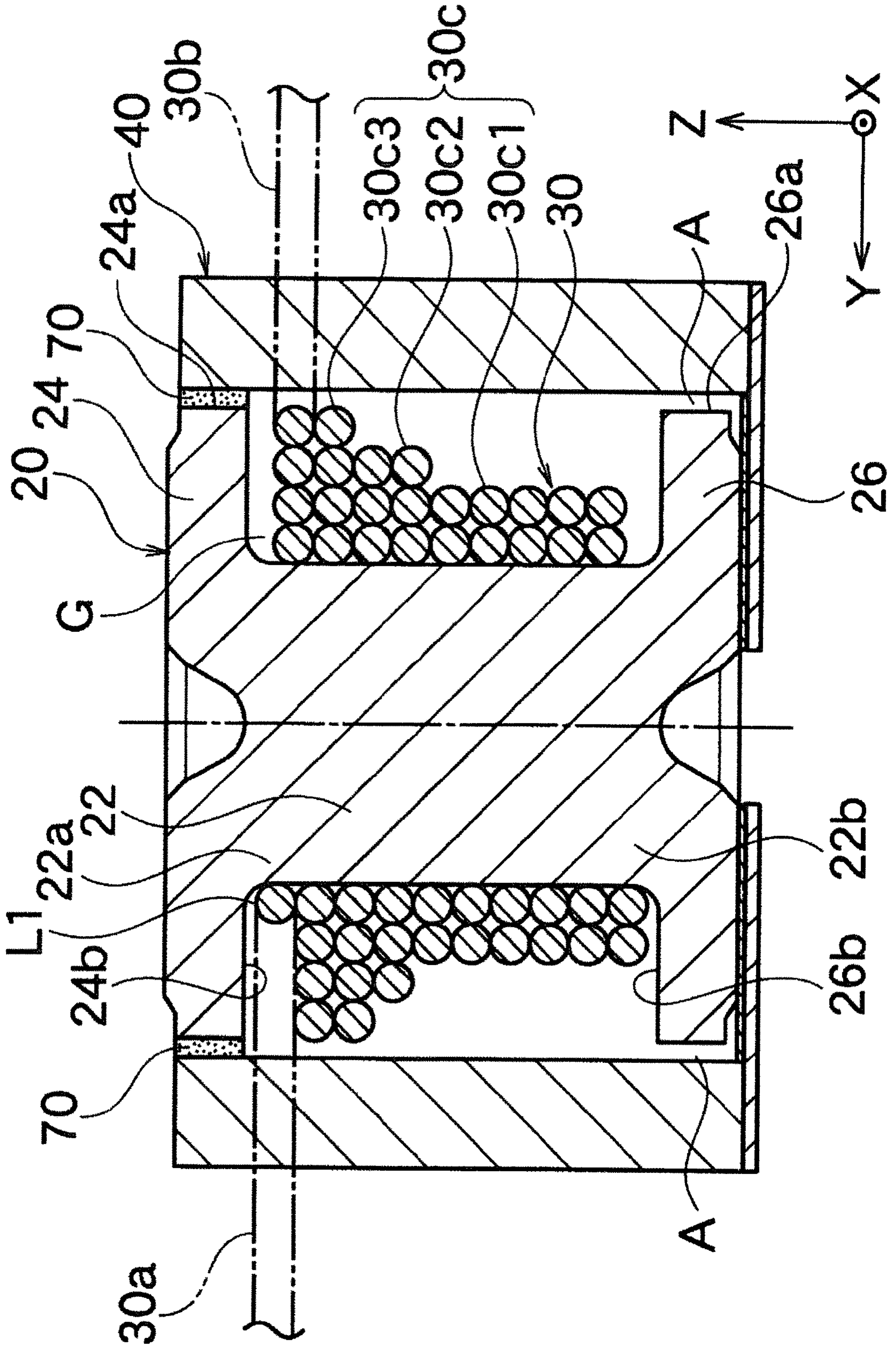
FIG. 4 is a cross-sectional view of the coil device illustrated in FIG. 1A.

As illustrated in FIG. 4, the upper flange portion outer peripheral surface 24*a* and the core inner peripheral surface 48 are joined by an adhesive-hardened portion 70 formed by hardening an adhesive such as epoxy and urethane resins and, as a result, the outer core 40 and the inner core 20 are fixed to each other. In other words, the adhesive-hardened portion 70 is disposed in the gap A formed between the core inner peripheral surface 48 and the upper flange portion outer peripheral surface 24*a* and the outer core 40 is connected to the inner core 20 to form a magnetic path.

The core inner peripheral surface 48 and the lower flange portion outer peripheral surface 26*a* are not joined via the adhesive-hardened portion 70, and a space is formed in the gap A between the core inner peripheral surface 48 and the lower flange portion outer peripheral surface 26*a*.

As illustrated in FIG. 1C, when the outer core 40 is viewed from the axial direction, the circumferential shape of the core outer peripheral surface 46 is a substantially quadrangular shape that has an R shape at each of the four corners. On the other hand, the core inner peripheral surface 48 has a circular circumferential shape, which is different from the circumferential shape of the core outer peripheral surface 46. Accordingly, the radial thickness of the outer core 40 defined by the radial distance between the core inner peripheral surface 48 and the core outer peripheral surface 46 changes along the circumferential direction of the outer core 40.

Figure 3:
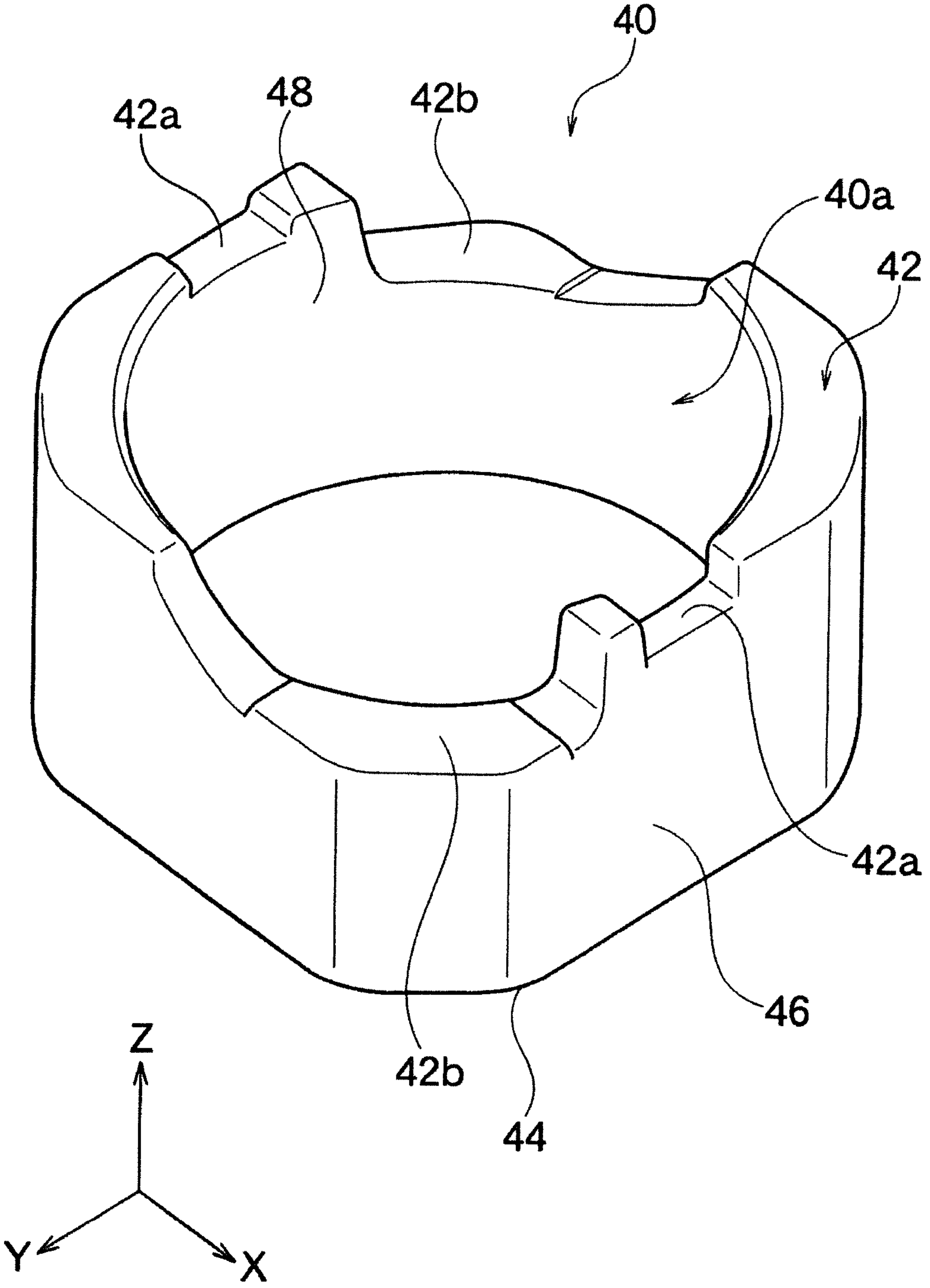
FIG. 3 is a perspective view of an outer core in the coil device illustrated in FIG. 1A.

As illustrated in FIG. 3, the core lower surface 44 is the end surface of the outer core 40 on the Z-axis negative direction side and has a planar shape. The core upper surface 42 is the end surface of the outer core 40 on the Z-axis positive direction side and has a pair of engaging end surfaces 42*a* and a pair of support end surfaces 42*b*. The engaging end surface 42*a* is formed of a recess-shaped portion. The engaging end surfaces 42*a* are formed at the Y-axis-direction center part of the core upper surface 42 and both X-axis-direction end portions of the core upper surface 42. A first fixed portion 52 in the first terminal portion 50 (described later) and a second fixed portion 62 in the second terminal portion 60 (described later) are engaged with the engaging end surfaces 42*a*.

The support end surface 42*b* is formed of a recess-shaped portion. The support end surfaces 42*b* are formed at two corner portions diagonally positioned on the core upper surface 42. The support end surface 42*b* is disposed adjacent to the engaging end surface 42*a* in the circumferential direction. The support end surfaces 42*b* are provided with a first connection portion 54 in the first terminal portion 50 (described later) and a second connection portion 64 in the second terminal portion 60 (described later), respectively. The distance from the support end surface 42*b* to the core lower surface 44 is shorter than the distance from the engaging end surface 42*a* to the core lower surface 44. The support end surface 42*b* is provided below the engaging end surface 42*a*. In addition, the maximum radial thickness of the support end surface 42*b* exceeds the maximum radial thickness of the engaging end surface 42*a*.

The degree of curve of the core outer peripheral surface 46 in the circumferential direction is slightly different between the positions of one support end surface 42*b* and the other support end surface 42*b*. More specifically, as illustrated in FIG. 1C, the degree of curve of the support end surface 42*b* positioned on the X-axis positive direction side is slightly larger than the degree of curve of the support end surface 42*b* positioned on the X-axis negative direction side. Alternatively, the degrees may be equal to each other.

As illustrated in FIG. 2, the first terminal portion 50 and the second terminal portion 60 as a pair are provided on the outer core 40 and a first lead portion 30*a* as one end portion of the wire 30 and a second lead portion 30*b* as the other end portion of the wire 30 are connected to the first terminal portion 50 and the second terminal portion 60, respectively. The first terminal portion 50 and the second terminal portion 60 are made by machining a metal plate material such as a copper alloy. The first terminal portion 50 has the first fixed portion 52 fixed to the outer core 40, the first connection portion 54 connected to the first lead portion 30*a*, and a first connecting portion 56 connecting the first connection portion 54 and the first fixed portion 52. The first terminal portion 50 is attached to the X-axis positive direction side of the outer core 40. The first fixed portion 52 is fixed so as to straddle the engaging end surface 42*a*, the core lower surface 44, and the core outer peripheral surface 46 on the X-axis positive direction side of the outer core 40. The first connection portion 54 crimps and fixes the first lead portion 30*a*.

The second terminal portion 60 has the second fixed portion 62 fixed to the outer core 40, the second connection portion 64 connected to the second lead portion 30*b*, and a second connecting portion 66 connecting the second connection portion 64 and the second fixed portion 62. The second terminal portion 60 is attached to the X-axis negative direction side of the outer core 40 and is provided at a position rotated by a predetermined angle (approximately 180 degrees in the present embodiment) in the circumferential direction with respect to the first terminal portion 50. The second fixed portion 62 is fixed so as to straddle the engaging end surface 42*a*, the core lower surface 44, and the core outer peripheral surface 46 on the X-axis negative direction side of the outer core 40. The second connection portion 64 crimps and fixes the second lead portion 30*b*.

As illustrated in FIG. 4, the wire 30 is wound around the winding core portion 22 to constitute the winding portion 30*c*. The wire 30 is started to be wound around the first end portion 22*a* of the winding core portion 22 at a position adjacent to an inner surface (back surface) 24*b* of the upper flange portion 24. The distance between the first lead portion 30*a* positioned at a winding start position L1 of the wire 30 and the inner surface 24*b* of the upper flange portion 24 is preferably 0. Alternatively, a slight gap (e.g. gap with a width that is approximately ¼ to ½ of the wire diameter of the wire 30) may be formed.

Figure 5:
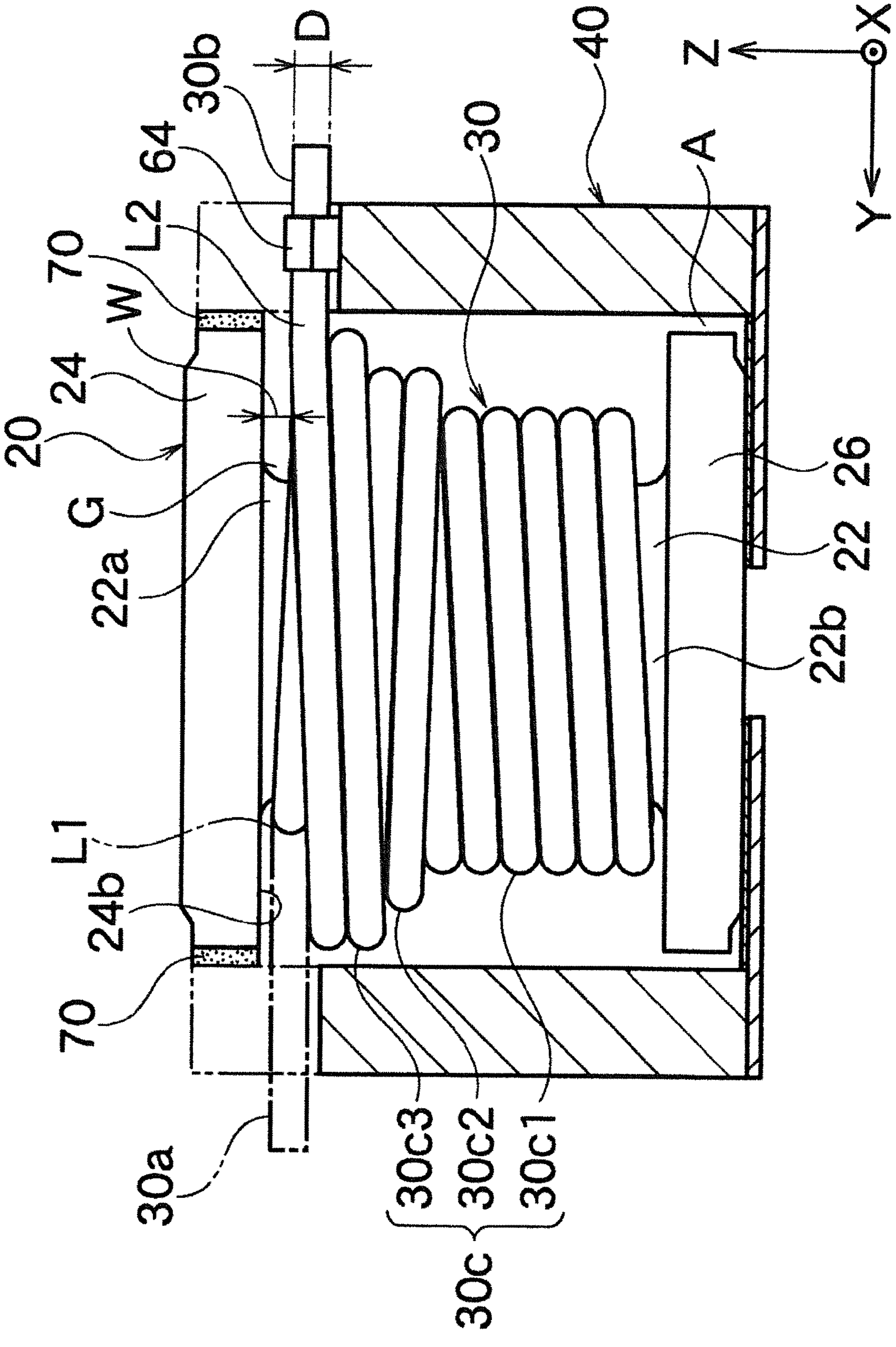
FIG. 5 is a diagram for describing the configuration of a winding portion in the coil device illustrated in FIG. 1A.

In the present embodiment, the number of turns (number of layers) of the wire 30 along the radial direction of the winding core portion 22 (Y-axis direction) is larger on one side in the axial direction of the winding core portion 22 (Z-axis positive direction side) than on the other side in the axial direction of the winding core portion 22 (Z-axis negative direction side). In other words, the winding portion 30*c* is intensively (densely) wound on one side in the axial direction of the winding core portion 22 and the number of turns is locally increased on one side in the axial direction of the winding core portion 22. Accordingly, as illustrated in FIG. 5, bulging portions (winding regions 30*c*2 and 30*c*3 to be described later) bulging to the outside in the radial direction are formed in the winding portion 30*c* on one side in the axial direction of the winding core portion 22 and the shape of the winding portion 30*c* is different (asymmetrical) between one side and the other side in the axial direction of the winding core portion 22.

As illustrated in FIG. 4, the winding portion 30*c* includes a winding region 30*c*1 where the number of turns along the radial direction of the winding core portion 22 is 2 turns (2 layers), the winding region 30*c*2 where the number of turns along the radial direction of the winding core portion 22 is 3 turns (3 layers), and the winding region 30*c*3 where the number of turns along the radial direction of the winding core portion 22 is 4 turns (4 layers). Each of the winding region 30*c*2 and the winding region 30*c*3 is disposed on one side in the axial direction of the winding core portion 22. Preferably, the winding region 30*c*3 is formed in the range of 1.3 mm or less from the inner surface 24*b* of the upper flange portion 24 toward the other side in the axial direction of the winding core portion 22. More preferably, the winding region 30*c*3 is formed in the range of 0.95 mm or less from the inner surface 24*b* of the upper flange portion 24 toward the other side in the axial direction of the winding core portion 22. In the present embodiment, the winding region 30*c*2 and the winding region 30*c*3, which are larger in turn count, are disposed on one side in the axial direction of the winding core portion 22 under the technical idea of locally increasing the number of turns of the wire 30 in the first end portion 22*a* of the winding core portion 22.

The winding region 30*c*3 is disposed on one side of the winding region 30*c*2 along the axial direction of the winding core portion 22. The winding region 30*c*2 is disposed on one side of the winding region 30*c*1 along the axial direction of the winding core portion 22. The winding region 30*c*1 is formed in 5 to 6 turns along the axial direction of the winding core portion 22. The winding region 30*c*2 is formed in 1 to 2 turns along the axial direction of the winding core portion 22. The winding region 30*c*3 is formed in 2 turns along the axial direction of the winding core portion 22. In other words, the winding region 30*c*1 is formed over a range wider than the winding region 30*c*2 and the winding region 30*c*3 along the axial direction of the winding core portion 22.

Here, the wire 30 is wound around the winding core portion 22 by a predetermined turn and from one side toward the other side in the axial direction. Then, the wire 30 is wound by a predetermined turn and from the other side toward one side in the axial direction. In other words, the wire 30 is continuously wound so as to reciprocate in the region from one side to the other side in the axial direction of the winding core portion 22, and thus the number of turns of the wire 30 along the radial direction of the winding core portion 22 is at least 2 turns.

Further, in the present embodiment, the wire 30 is wound around the outer peripheral surface of the winding core portion 22 such that the number of turns along the radial direction of the winding core portion 22 is 2 turns and then continuously wound so as to reciprocate only in the region on one side in the axial direction of the winding core portion 22 (region above the axial center of the winding core portion 22). Accordingly, the number of turns of the wire 30 along the radial direction of the winding core portion 22 is 4 turns on one side in the axial direction of the winding core portion 22.

In the region on one side in the axial direction of the winding core portion 22, a part where the number of turns of the wire 30 along the radial direction of the winding core portion 22 is 3 turns is formed in the event of an outward-to-return switch during the reciprocating movement of the wire 30 described above. As a result, the winding region 30*c*2 where the number of turns along the radial direction of the winding core portion 22 is 3 turns and the winding region 30*c*3 where the number of turns along the radial direction of the winding core portion 22 is 4 turns are formed in the region on one side in the axial direction of the winding core portion 22.

The number of turns of the wire 30 along the radial direction of the winding core portion 22 continuously changes in the three stages of 2 turns 3 turns 4 turns from the other side toward one side in the axial direction of the winding core portion 22 and gradually increases. Accordingly, the thickness of the winding portion 30*c* along the radial direction gradually increases from the other side toward one side in the axial direction of the winding core portion 22 (see FIG. 2). In addition, the outer periphery of the winding portion 30*c* is not flat from the other side toward one side in the axial direction of the winding core portion 22 and is an inclined surface on one side in the axial direction of the winding core portion 22.

As illustrated in FIG. 5, a winding end position L2 of the wire 30 is positioned in the first end portion 22*a* on one side in the axial direction of the winding core portion 22 together with the winding start position L1 of the wire 30. Accordingly, the second lead portion 30*b* of the wire 30 is connected to the second connection portion 64 of the second terminal portion 60 in a state where the second lead portion 30*b* of the wire 30 is pulled out straight, so as to be substantially parallel to the Y axis, and along the radial direction of the winding portion 30*c* in the vicinity of the inner surface 24*b* of the upper flange portion 24. As a result, the height of the winding end position L2 of the wire 30 is substantially equal to the height of the position where the second connection portion 64 is disposed.

In addition, the first lead portion 30*a* of the wire 30 is connected to the first connection portion 54 (FIG. 2) of the first terminal portion 50 in a state where the first lead portion 30*a* of the wire 30 is pulled out straight, so as to be substantially parallel to the Y axis, and along the radial direction of the winding portion 30*c* in the vicinity of the inner surface 24*b* of the upper flange portion 24. As a result, the height of the winding start position L1 of the wire 30 is substantially equal to the height of the position where the first connection portion 54 is disposed.

In a case where the second connection portion 64 is positioned below the illustrated position, it is preferable that the position of the winding end position L2 of the wire 30 is positioned below the illustrated position in accordance with the position of the second connection portion 64.

The second lead portion 30*b* of the wire 30 is pulled out toward the second connection portion 64 from the outer periphery of the winding region 30*c*3 at the winding end position L2 in a state where the number of turns of the wire 30 along the radial direction of the winding core portion 22 is locally increased on one side in the axial direction of the winding core portion 22. The second lead portion 30*b* is pulled out toward the second connection portion 64 after the wire 30 is wound around the outer peripheral surface of the winding core portion 22 until the width of the winding region 30*c*3 along the radial direction becomes substantially equal to the radial length of the upper flange portion 24.

The winding end position L2 of the wire 30 positionally deviates to the other side in the axial direction of the winding core portion 22 with respect to the winding start position L1 of the wire 30. Accordingly, a gap G is formed between the inner surface 24*b* of the upper flange portion 24 and the wire 30 positioned at the winding end position L2 of the wire 30 (the outermost peripheral turn of the wire 30 in the winding region 30*c*3). At the position of the gap G, the outer peripheral surface of the winding core portion 22 is exposed. When the wire diameter of the wire 30 is D and the deviation width of the winding end position L2 with respect to the winding start position L1 of the wire 30 (width of the gap G in the Z-axis direction) is W, $W \geq D/2$ is preferable and $W \geq D$ or more is more preferable.

Figure 7A:
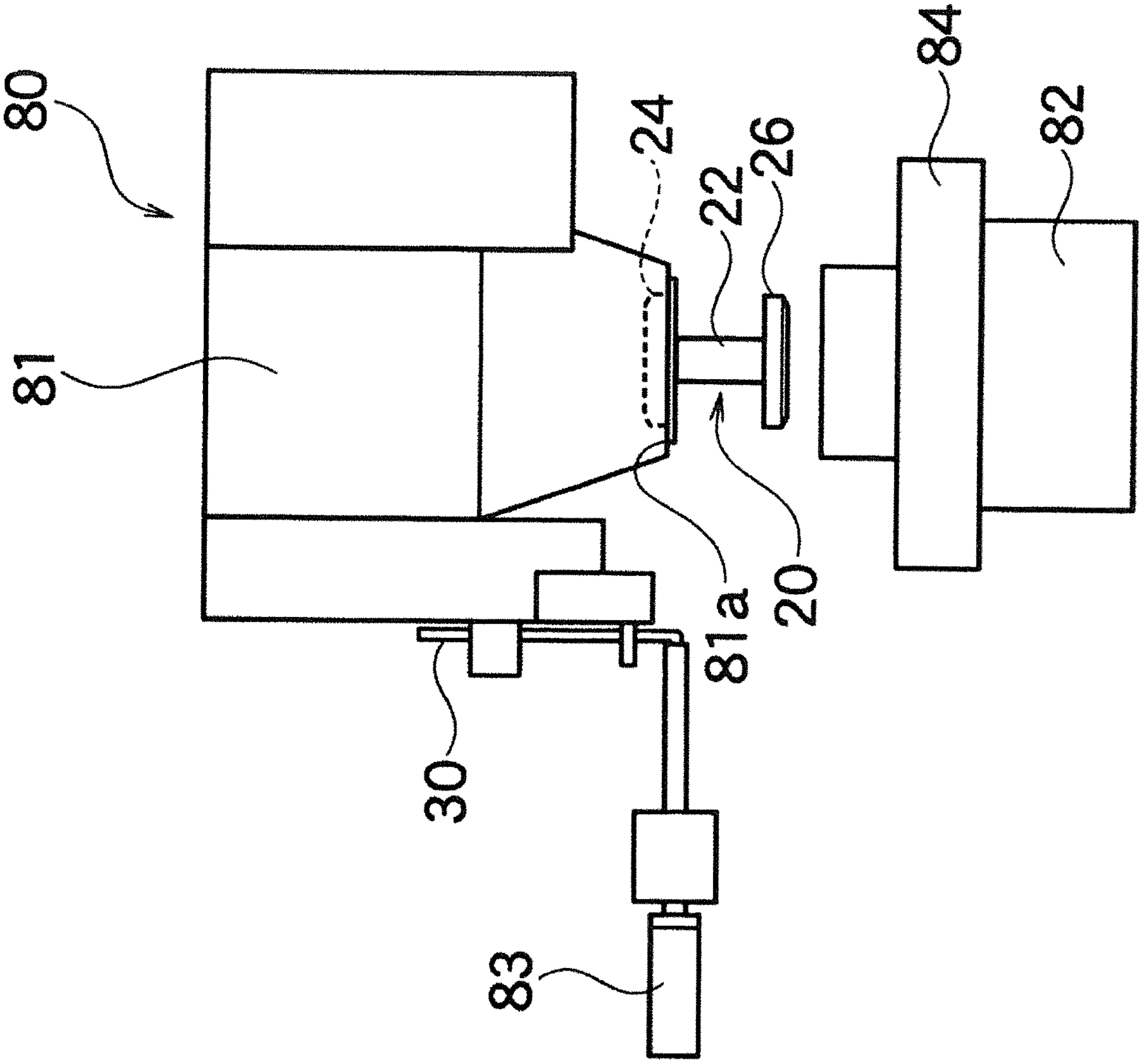
FIG. 7A is a diagram illustrating a method for manufacturing the coil device illustrated in FIG. 1A.

Hereinafter, a method for manufacturing the coil device 10 will be described. First, the inner core 20 is prepared and the inner core 20 is set in a winding machine 80 as illustrated in FIG. 7A. The winding machine 80 has a first rotating body 81, a second rotating body 82, a nozzle 83, and a position adjusting unit 84. The first rotating body 81 has a fixing portion 81*a*. The upper flange portion 24 of the inner core 20 can be fixed to the fixing portion 81*a*. The position adjusting unit 84 is integrally configured with respect to the second rotating body 82.

Figure 7B:
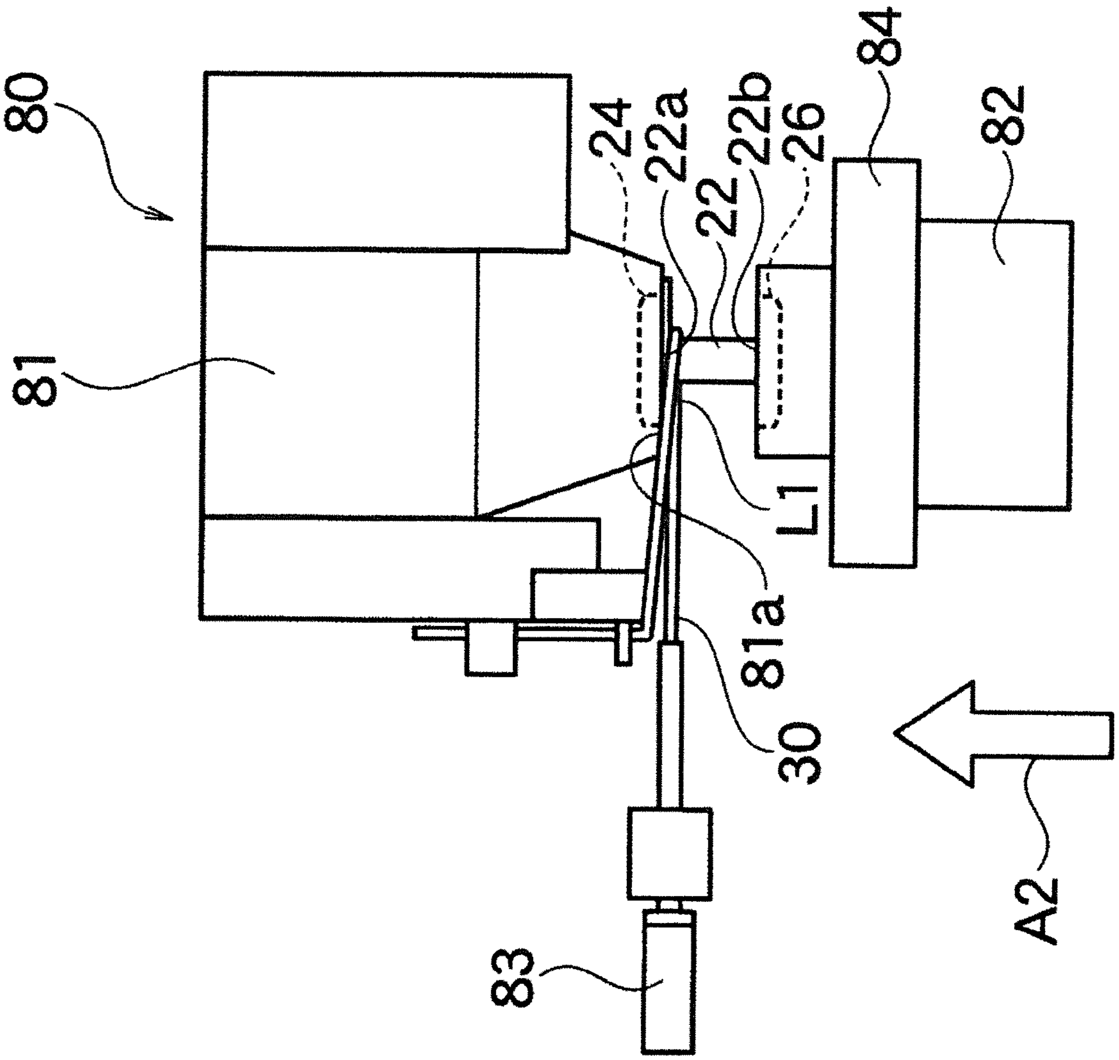
FIG. 7B is a diagram illustrating a process following the process illustrated in FIG. 7A.

Next, as illustrated in FIG. 7B, the second rotating body 82 is moved in the direction of the arrow A2 in the drawing with the upper flange portion 24 fixed to the fixing portion 81*a*. Then, the wire 30 is wound around the outer peripheral surface of the winding core portion 22 using the nozzle 83.

Figure 7C:
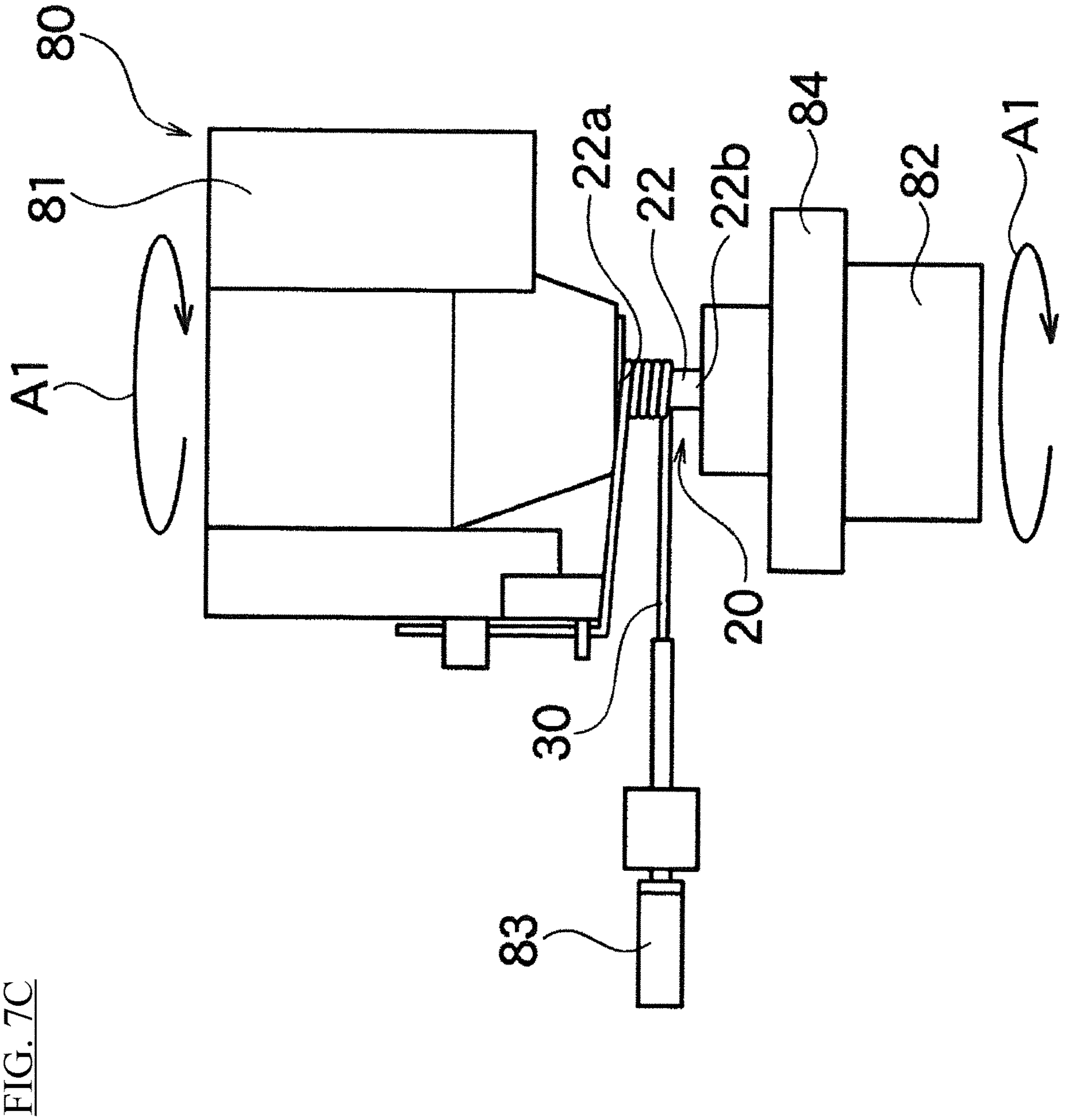
FIG. 7C is a diagram illustrating a process following the process illustrated in FIG. 7B.
Figure 7D:
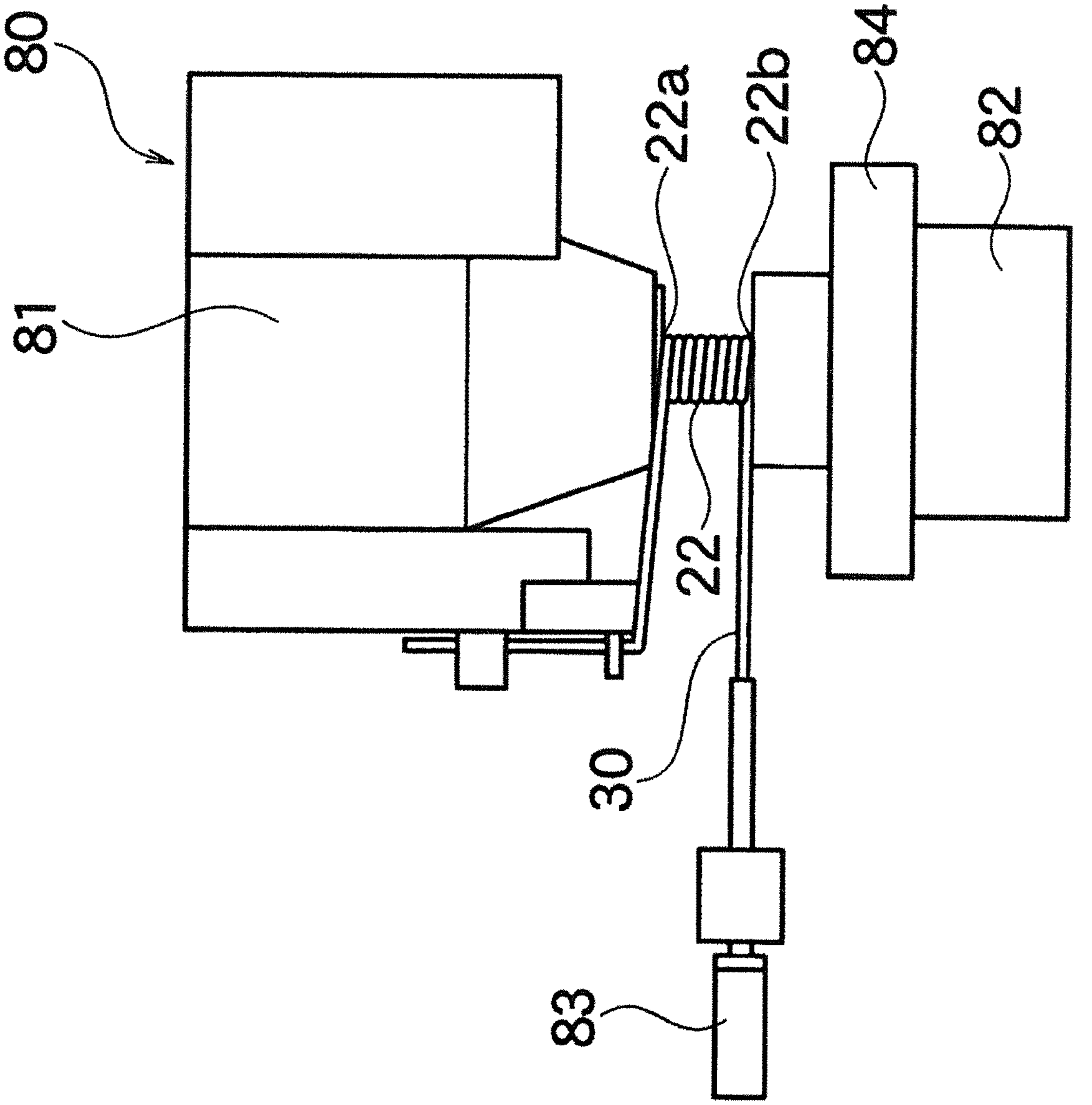
FIG. 7D is a diagram illustrating a process following the process illustrated in FIG. 7C.

Next, as illustrated in FIG. 7C, the first rotating body 81 and the second rotating body 82 are rotated in, for example, the direction of the arrow A1 in the drawing and the wire 30 is wound from one side (first end portion 22*a*) in the axial direction of the winding core portion 22 toward the other side (second end portion 22*b*) while the direction of the nozzle 83 is adjusted. Then, as illustrated in FIG. 7D, the wire 30 is wound up to the second end portion 22*b* of the winding core portion 22 such that the number of turns of the wire 30 along the radial direction of the winding core portion 22 is 1 turn. At the point in time when the wire 30 is wound around the second end portion 22*b*, the winding direction (progress direction) along the axial direction of the wire 30 is reversed and the wire 30 is wound from the other side (second end portion 22*b*) in the axial direction of the winding core portion 22 toward one side (first end portion 22*a*) such that the number of turns of the wire 30 along the radial direction of the winding core portion 22 is 2 turns.

Figure 7E:
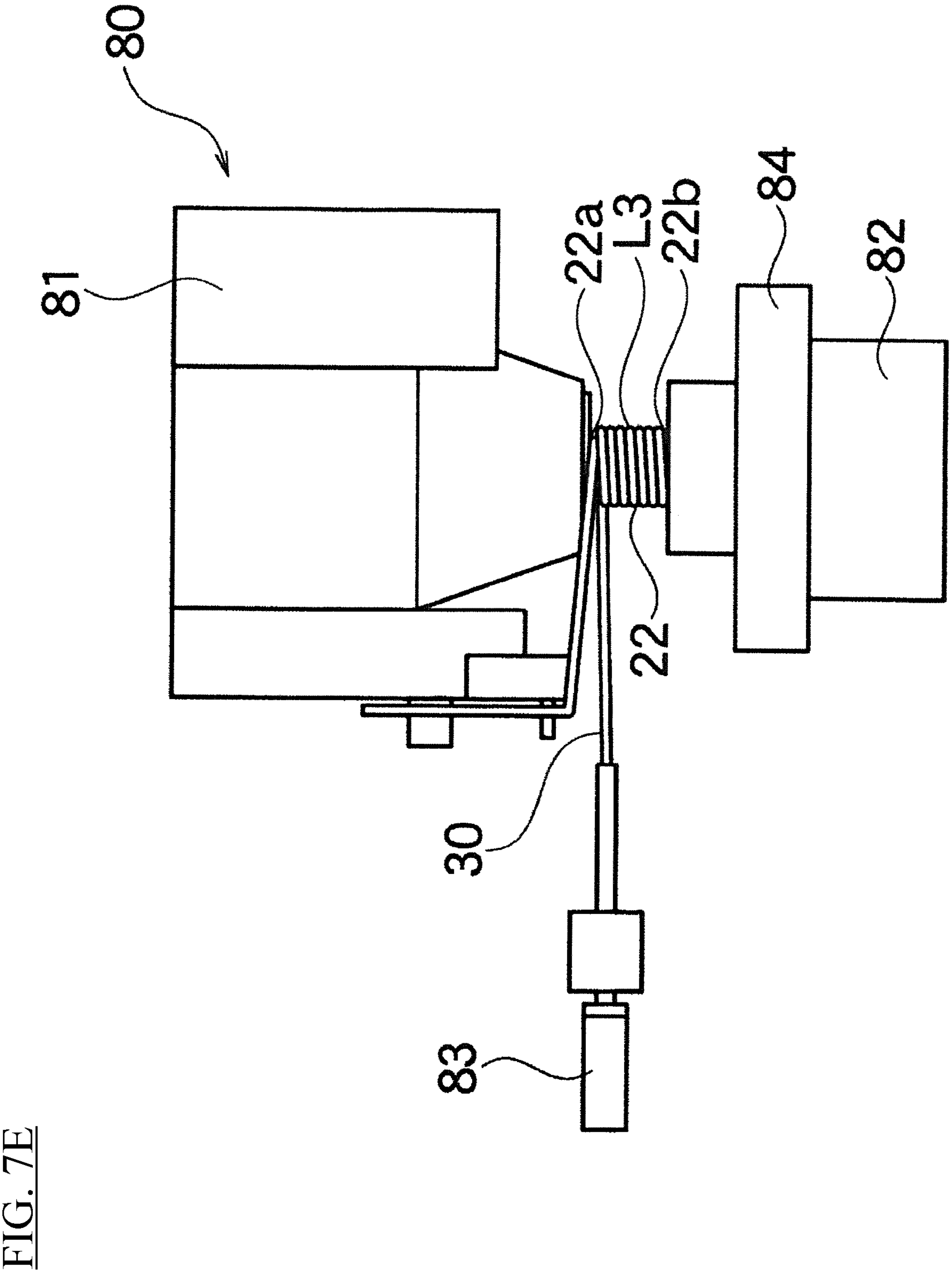
FIG. 7E is a diagram illustrating a process following the process illustrated in FIG. 7D.

As illustrated in FIG. 7E, at the point in when the wire 30 is wound around the first end portion 22*a* of the winding core portion 22, the winding direction along the axial direction of the wire 30 is reversed again and the wire 30 is wound from one side (first end portion 22*a*) in the axial direction of the winding core portion 22 toward the other side (a position L3) such that the number of turns of the wire 30 along the radial direction of the winding core portion 22 is 3 turns. Here, the position L3 is positioned on one side in the axial direction of the winding core portion 22 and corresponds to the position of the end portion (lower end portion) of the winding region 30*c*2 in FIG. 4 that is on the Z-axis negative direction side.

Figure 7F:
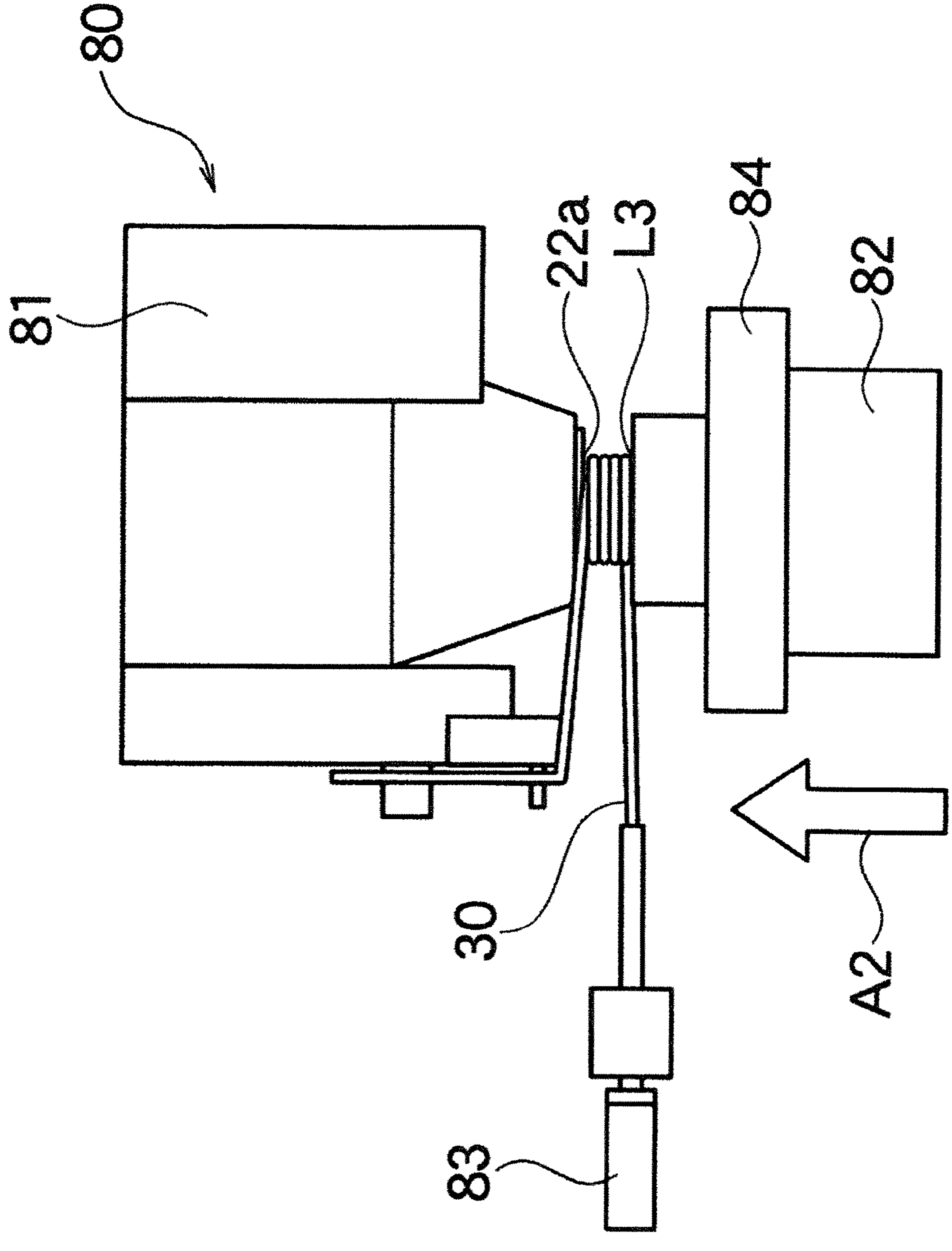
FIG. 7F is a diagram illustrating a process following the process illustrated in FIG. 7E.

As illustrated in FIG. 7F, at the point in time when the wire 30 is wound around the position L3, the position adjusting unit 84 is moved in the direction of the arrow A2 in the drawing and the second rotating body 82 is disposed at the position L3. Subsequently, the winding direction along the axial direction of the wire 30 is reversed again and the wire 30 is wound from the position L3 toward one side (first end portion 22*a*) in the axial direction of the winding core portion 22 such that the number of turns of the wire 30 along the radial direction of the winding core portion 22 is 4 turns.

By disposing the second rotating body 82 at the position L3 in this manner, it is possible to prevent the wire 30 from being wound on the other side beyond the position L3 and forcibly wind the wire 30 only on one side beyond the position L3 regarding the axial direction of the winding core portion 22. In addition, it is possible to prevent the wire 30 forming the fourth turn from falling (stepping down) to the other side of the position L3 to cause a short circuit defect.

Figure 7G:
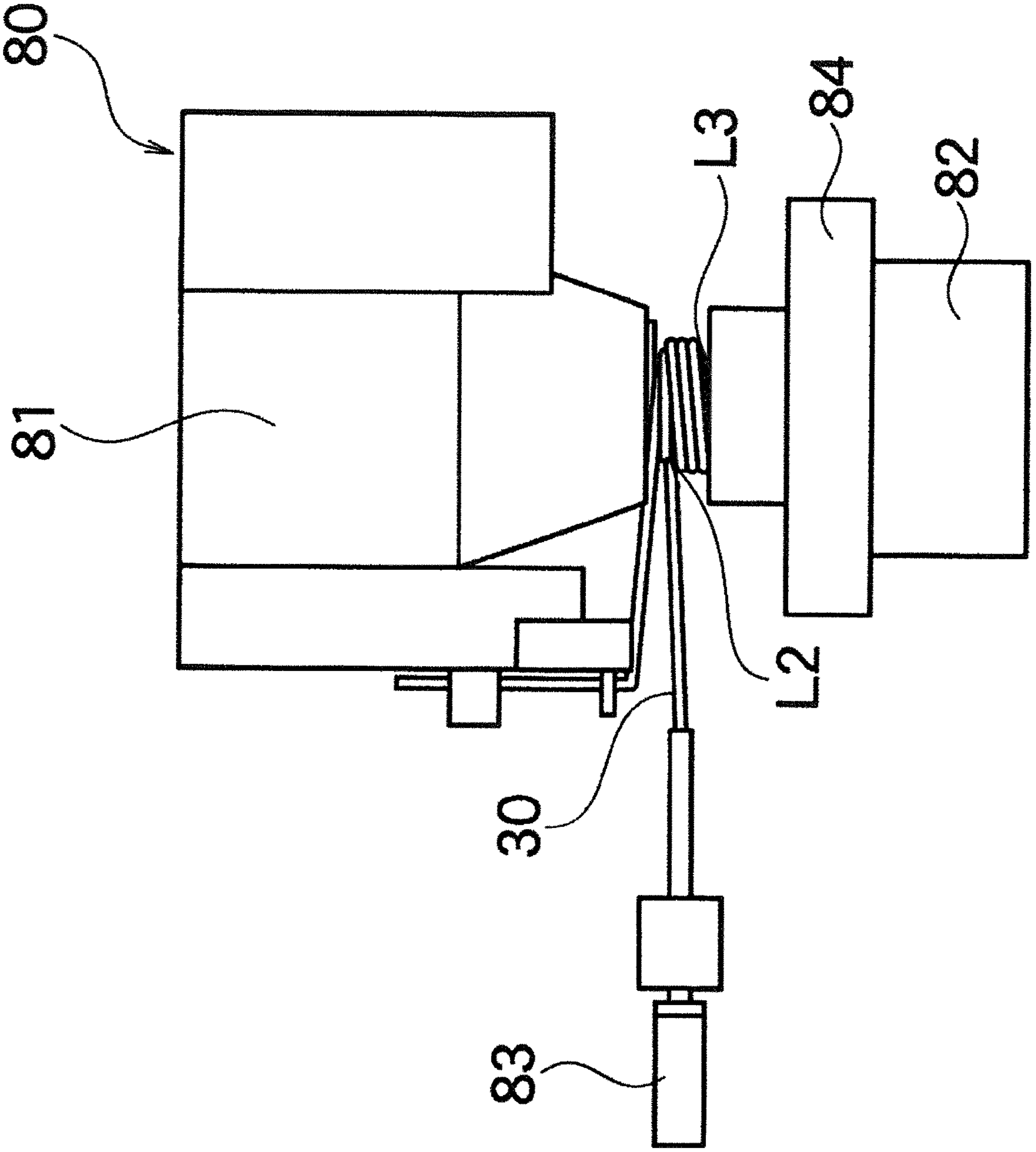
FIG. 7G is a diagram illustrating a process following the process illustrated in FIG. 7F.
Figure 7H:
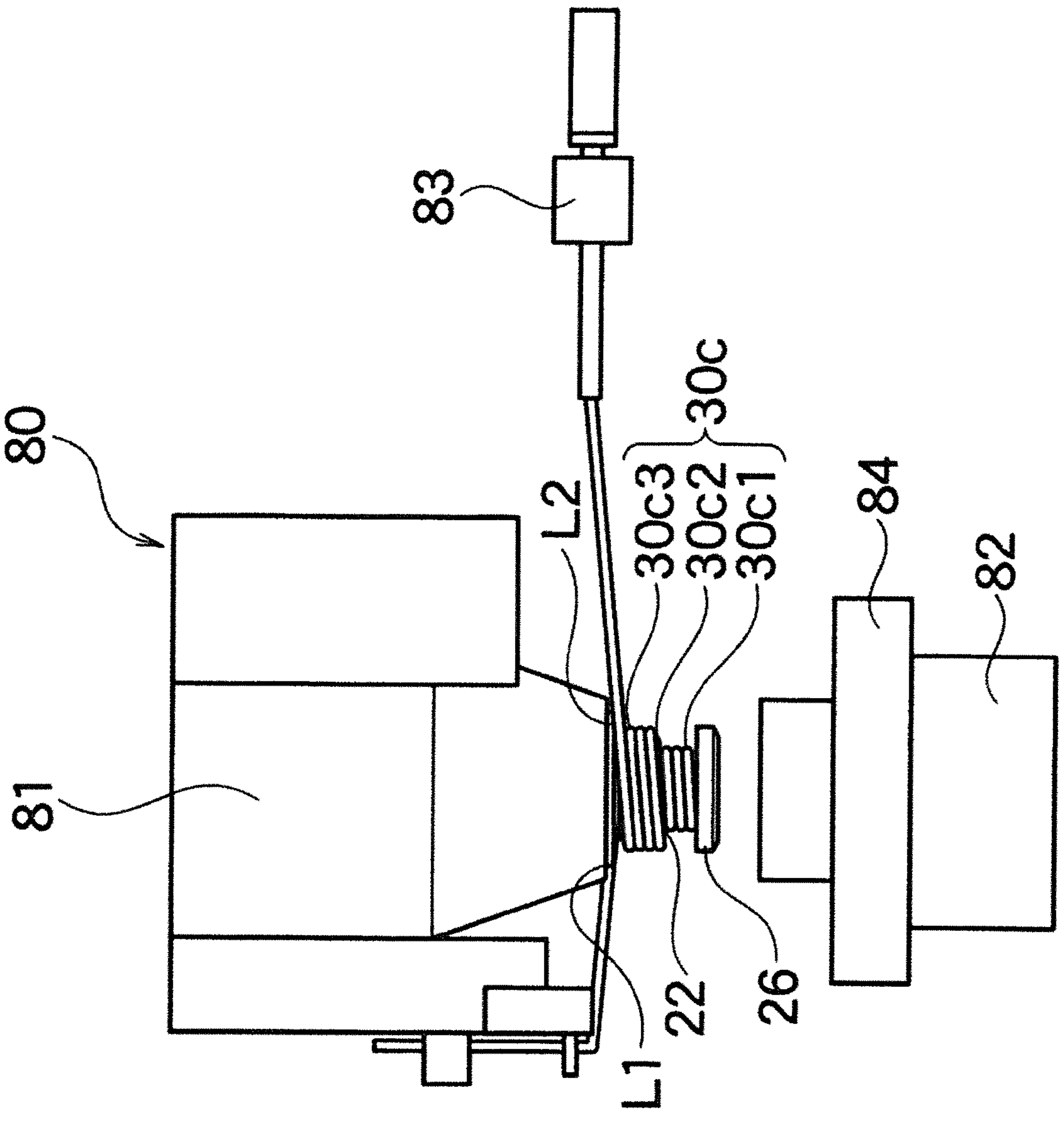
FIG. 7H is a diagram illustrating a process following the process illustrated in FIG. 7G.

It is possible to form the winding portion 30*c* provided with the winding regions 30*c*1 to 30*c*3 on the outer peripheral surface of the winding core portion 22 as illustrated in FIG. 7H by winding the wire 30 up to the winding end position L2 as illustrated in FIG. 7G. The winding end position L2 of the wire 30 is positioned on the other side in the axial direction of the winding core portion 22 by a predetermined length (e.g. distance that is substantially equal to the wire diameter of the wire 30) beyond the winding start position L1 of the wire 30.

Next, the inner core 20 provided with the winding portion 30*c* illustrated in FIG. 7H is inserted through the insertion hole 40*a* of the outer core 40 illustrated in FIG. 3. As illustrated in FIGS. 1A and 1B, the first terminal portion 50 and the second terminal portion 60 are pre-attached at predetermined positions of the outer core 40 using an adhesive or the like.

Next, as illustrated in FIGS. 1A and 1B, the first lead portion 30*a* of the wire 30 is connected to the first connection portion 54 of the first terminal portion 50, the second lead portion 30*b* of the wire 30 is connected to the second connection portion 64 of the second terminal portion 60, and the coil device 10 is obtained as a result.

As illustrated in FIGS. 4 and 5, in the coil device 10 according to the present embodiment described above, the winding end position L2 of the wire is positioned in the first end portion 22*a* on one side in the axial direction of the winding core portion 22 (Z-axis direction) together with the winding start position L1. Accordingly, after the wire 30 is wound around the winding core portion 22, the second lead portion 30*b* can be connected to the second connection portion 64 (FIG. 1B) in a state where the second lead portion 30*b* is pulled out from the winding end position L2 in a direction (Y-axis direction) orthogonal to the axial direction of the winding core portion 22. In a case where, for example, the winding end position L2 is positioned at a position separated downward from the first end portion 22*a* (e.g. axial center of the winding core portion 22), it is necessary to diagonally pull out the second lead portion 30*b* toward the second connection portion 64 in order to connect the second lead portion 30*b* to the second connection portion 64. However, in this case, the problem of the second lead portion 30*b* coming into contact with the upper end portion of the outer core 40 (opening edge portion of the insertion hole 40*a*) and the inner core 20 wound by the wire 30 being inclined with respect to the outer core 40 may arise. On the other hand, in the coil device 10 according to the present embodiment, the second lead portion 30*b* is pulled out in a direction orthogonal to the axial direction of the winding core portion 22, and thus the occurrence of such a problem can be prevented, the distance between the inner core 20 and the outer core 40 can be kept constant, and squealing can be reduced.

The inner core 20 being inclined with respect to the outer core 40 may lead to a decrease in the inductance value of the coil device 10. With the coil device 10 according to the present embodiment, the occurrence of such a problem can be prevented and the coil device 10 that is satisfactory in terms of inductance characteristics can be realized.

In the coil device 10 according to the present embodiment, the number of turns of the wire 30 along the radial direction of the winding core portion 22 is larger on one side in the axial direction of the winding core portion 22 than on the other side in the axial direction of the winding core portion 22. Accordingly, one side in the axial direction of the winding core portion 22 can be stabilized when the coil device 10 is mounted on the substrate (not illustrated), vibration of the substrate or the like can be suppressed, and squealing can be reduced.

In the present embodiment, the following effects can be obtained in the process of manufacturing the coil device 10. In a case where the second lead portion 30*b* is diagonally pulled out toward the second connection portion 64 as described above, the second lead portion 30*b* needs to be bent (changed in shape) (needs to be inclined) before the inner core 20 wound by the wire 30 is incorporated into the outer core 40. On the other hand, in the coil device 10 according to the present embodiment, the second lead portion 30*b* is pulled out in a direction orthogonal to the axial direction of the winding core portion 22, and thus the second lead portion 30*b* does not have to be bent and the coil device 10 is easy to assemble.

In the present embodiment, the wire 30 is wound in 2 or more turns along the radial direction of the winding core portion 22 from one side to the other side in the axial direction of the winding core portion 22 and the wire 30 is wound in 3 or more turns along the radial direction of the winding core portion 22 on one side in the axial direction of the winding core portion 22. Accordingly, the number of turns of the wire along the radial direction of the winding core portion 22 can be locally increased on one side in the axial direction of the winding core portion 22 and vibration of the substrate or the like can be effectively suppressed.

In the present embodiment, the wire 30 is started to be wound around the first end portion 22*a* of the winding core portion 22 at a position adjacent to the inner surface 24*b* of the upper flange portion 24. Accordingly, the first lead portion 30*a* can be connected to the first connection portion 54 (FIG. 1A) in a state where the second lead portion 30*b* is pulled out from the winding start position L1 of the wire 30 in a direction orthogonal to the axial direction of the winding core portion 22. In this case, the inner core 20 wound by the wire 30 is pulled in a direction orthogonal to the axial direction of the winding core portion 22 by the lead portions 30*a* and 30*b* respectively pulled out from the winding start position L1 and the winding end position L2, and the posture of the inner core 20 is stabilized by the tension that is received from each of the lead portions 30*a* and 30*b*. Accordingly, the occurrence of a problem such as the inner core 20 being inclined with respect to the outer core 40 can be effectively prevented and squealing can be effectively reduced.

In the present embodiment, the winding end position L2 of the wire 30 positionally deviates to the other side in the axial direction of the winding core portion 22 with respect to the winding start position L1. Even if the wire 30 is started to be wound around the first end portion 22*a* of the winding core portion 22 at a position in contact with the inner surface 24*b* of the upper flange portion 24 as described above, the gap G may be formed during the winding at a position adjacent to the inner surface 24*b* of the upper flange portion 24. With the above configuration, it is possible to prevent the outermost peripheral turn of the wire 30 positioned at the winding end position L2 from positionally deviating to one side in the axial direction of the winding core portion 22 and falling into the gap G in a case where the number of turns of the wire 30 along the radial direction of the winding core portion 22 is a plurality of turns. As a result, unwinding of the winding portion 30*c* and the occurrence of a short circuit defect can be effectively prevented.

In the present embodiment, the upper flange portion outer peripheral surface 24*a* is joined to the core inner peripheral surface 48 with the adhesive-hardened portion 70 and the gap A is formed between the lower flange portion outer peripheral surface 26*a* and the core inner peripheral surface 48. By joining the upper flange portion outer peripheral surface 24*a* to the core inner peripheral surface 48 with the adhesive-hardened portion 70, the inner core 20 or the outer core 40 can be effectively protected from impact or the like. In addition, by forming the gap A between the lower flange portion outer peripheral surface 26*a* and the core inner peripheral surface 48, the coil device 10 that is satisfactory in terms of inductance characteristics (e.g. direct current superimposition characteristics) can be realized.

Under the above configuration in particular, stress concentration in the portion (non-joined portion) around the gap A in the event of vibration of the inner core 20, the outer core 40, the substrate, or the like can be prevented, squealing can be effectively reduced, and damage or the like to the inner core 20 and the outer core 40 can be prevented by the number of turns of the wire 30 along the radial direction of the winding core portion 22 being larger on one side in the axial direction of the winding core portion 22 than on the other side in the axial direction of the winding core portion 22.

The present invention is not limited to the embodiment described above and can be variously modified within the scope of the present invention.

(1) In the above embodiment, the shape (winding shape) of the winding portion 30*c* is not limited to the shape illustrated in FIG. 4 and can be changed to various shapes. For example, in the example illustrated in FIG. 6A, a winding portion 30*c*A is formed only in the region on one side in the axial direction of the winding core portion 22 and the number of turns of the wire 30 along the radial direction of the winding core portion 22 is 2 turns. The winding portion 30*c*A is formed in 3 to 4 turns along the axial direction of the winding core portion 22. A non-winding portion 22*c* where the wire 30 is not wound is formed on the other side in the axial direction of the winding core portion 22, and the wire 30 is not wound around the second end portion 22*b* of the winding core portion 22.

The non-winding portion 22*c* occupies a region that is at least half along the axial direction of the winding core portion 22. In this region, the outer peripheral surface of the winding core portion 22 is exposed without being covered with the winding portion 30*c*A. As illustrated in the drawing, in the process of winding the wire 30 so as to reciprocate in the region on one side in the axial direction of the winding core portion 22, a region where the number of turns of the wire 30 along the radial direction of the winding core portion 22 is 1 turn is provided in the winding portion 30*c*A in the event of an outward-to-return switch. The region may be formed at the position illustrated in FIG. 6D depending on how the wire 30 is wound.

Even in a case where the number of turns of the wire 30 along the radial direction of the winding core portion 22 is 2 turns (minimum turn count in the present invention) on one side in the axial direction of the winding core portion 22 as described above, the number of turns of the wire 30 along the radial direction of the winding core portion 22 is relatively larger on one side in the axial direction of the winding core portion 22 than on the other side in the axial direction of the winding core portion 22 by the number of turns of the wire 30 along the radial direction of the winding core portion 22 being 0 on the other side in the axial direction of the winding core portion 22. Accordingly, the same effect as that of the first embodiment can be obtained in this modification example. In addition, the same effect as that of the above embodiment can be obtained even in a case where the winding region 30*c*A is replaced with a winding region 30*c*D illustrated in FIG. 6D.

Figure 6A:
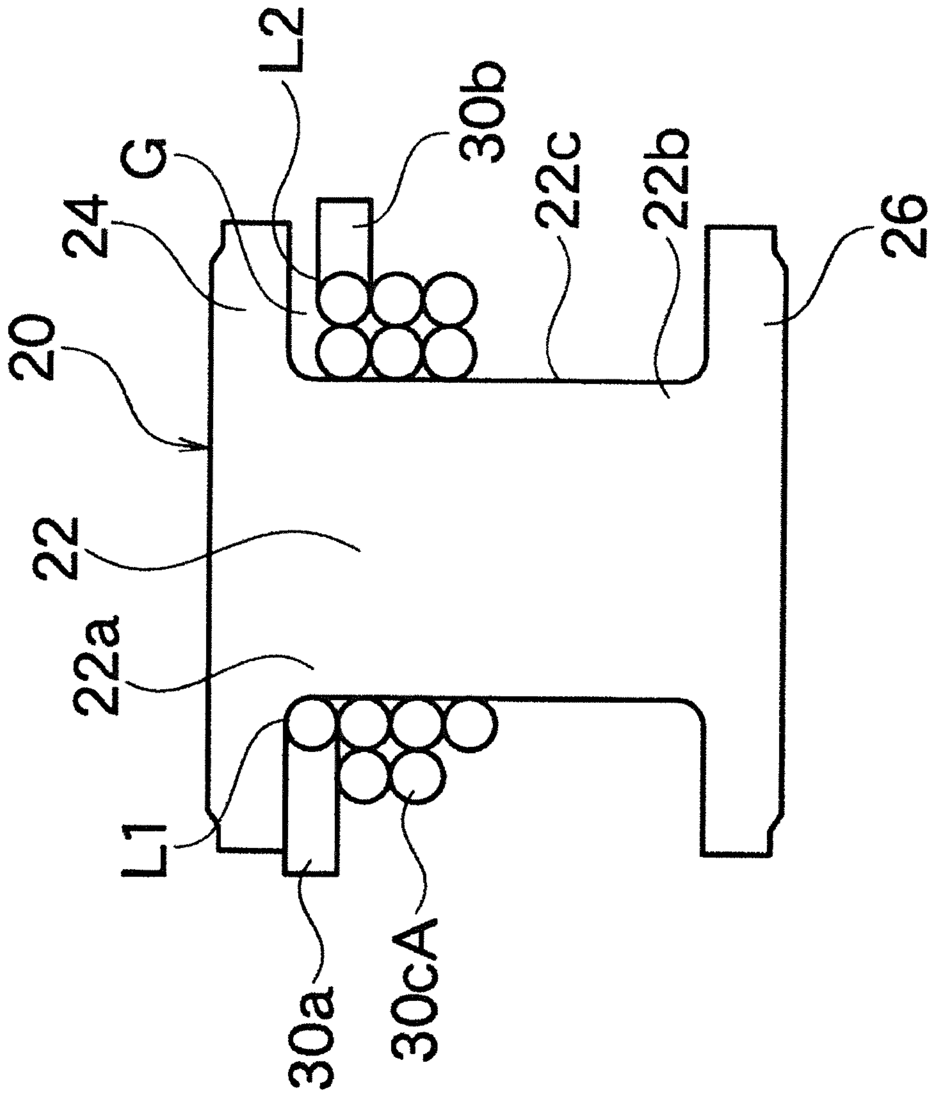
FIG. 6A is a diagram illustrating a modification example of the winding portion illustrated in FIG. 4.
Figure 6B:
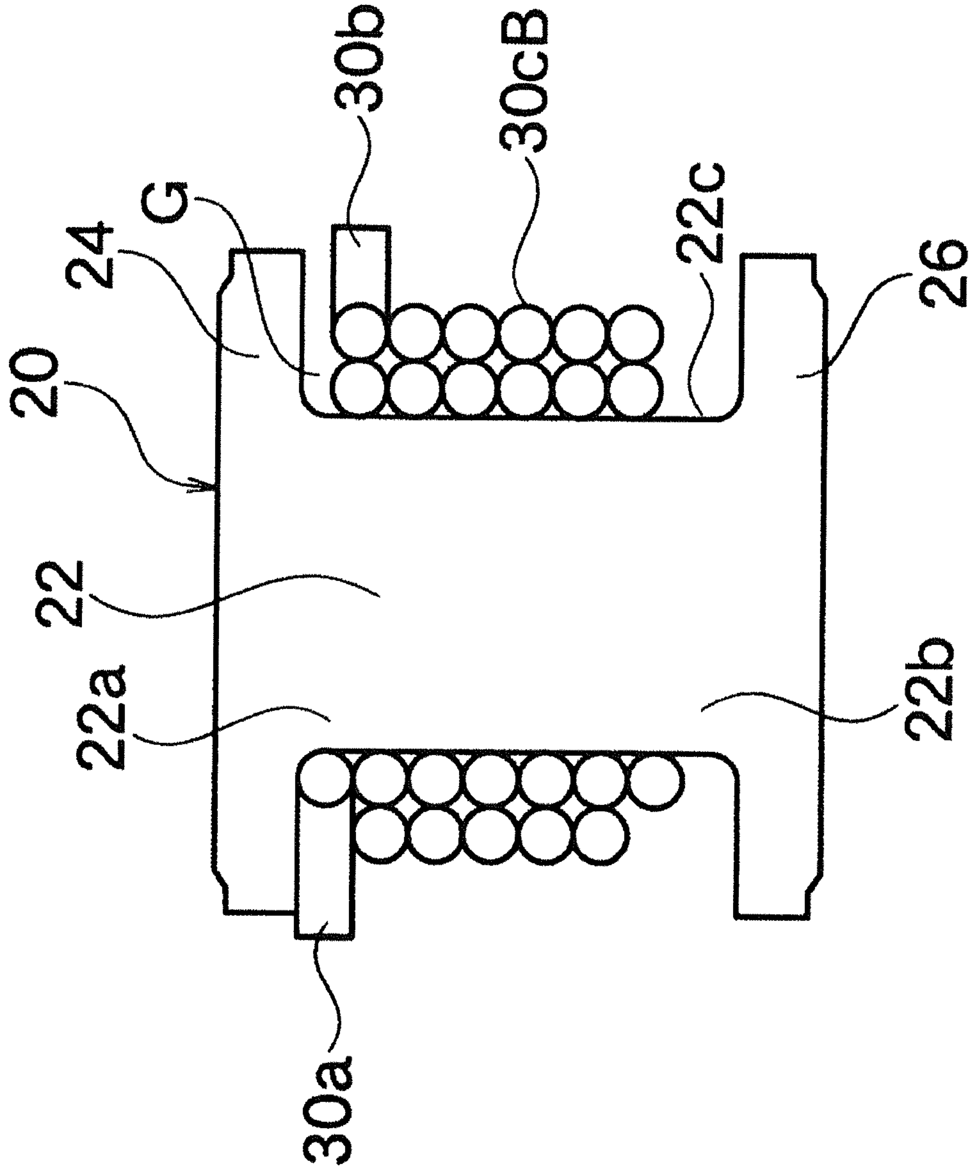
FIG. 6B is a diagram illustrating another modification example of the winding portion illustrated in FIG. 4.

(2) In the example illustrated in FIG. 6B, a winding portion 30*c*B extends to the other side beyond the axial center of the winding core portion 22 unlike in the example illustrated in FIG. 6A. The winding portion 30*c*B is formed in 6 to 7 turns along the axial direction of the winding core portion 22 and is formed over a range wider than the non-winding portion 22*c* along the axial direction of the winding core portion 22. The length of the non-winding portion 22*c* along the axial direction of the winding core portion 22 is approximately equal to or twice the wire diameter D of the wire 30.

In this modification example, the wire 30 is not wound around the second end portion 22*b* of the winding core portion 22 and the number of turns of the wire 30 along the radial direction of the winding core portion 22 is locally reduced on the other side in the axial direction of the winding core portion 22. In other words, the number of turns of the wire along the radial direction of the winding core portion 22 can be relatively increased on one side in the axial direction of the winding core portion 22 and the same effect as that of the above embodiment can be obtained.

Figure 6C:
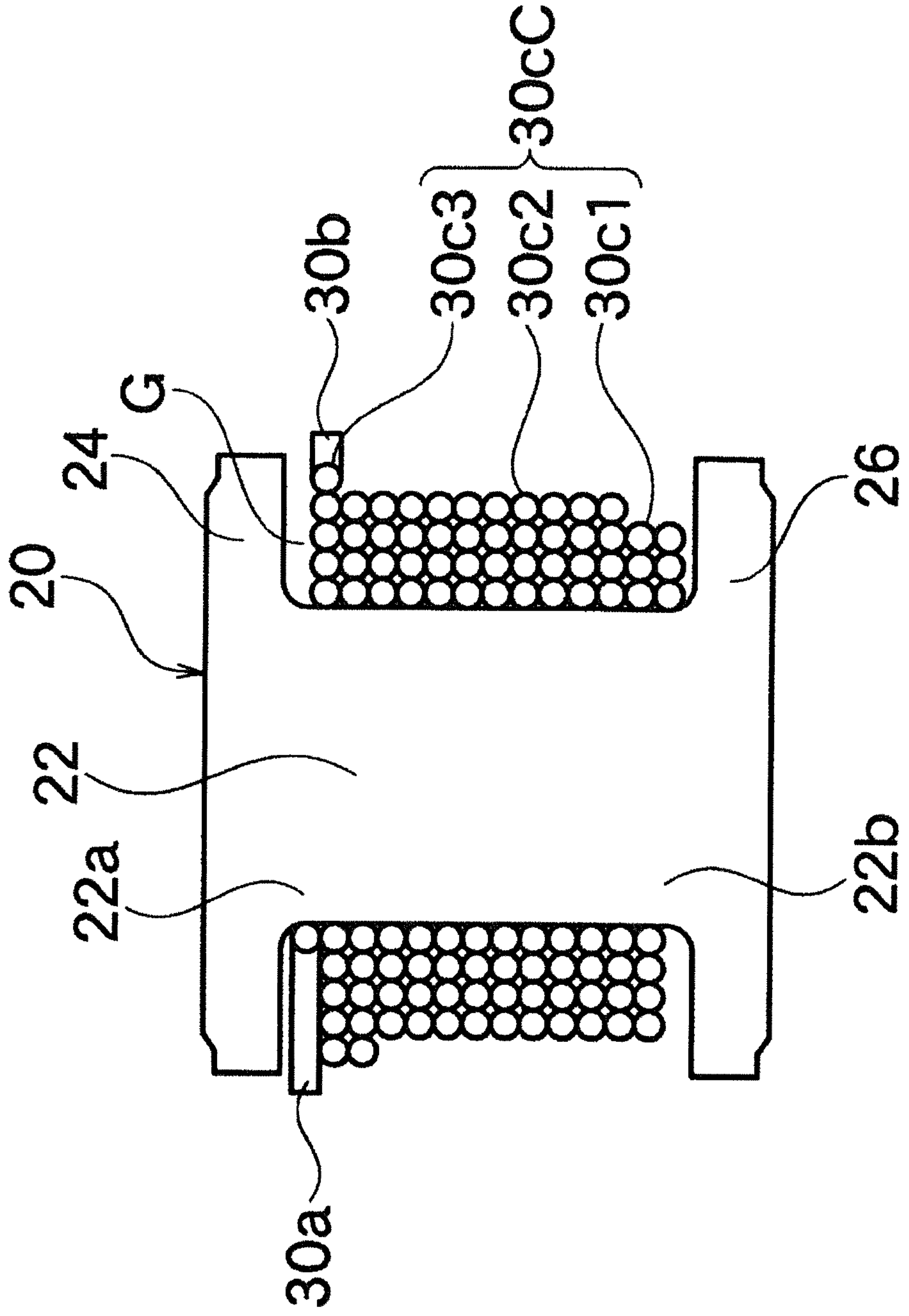
FIG. 6C is a diagram illustrating another modification example of the winding portion illustrated in FIG. 4.
Figure 6D:
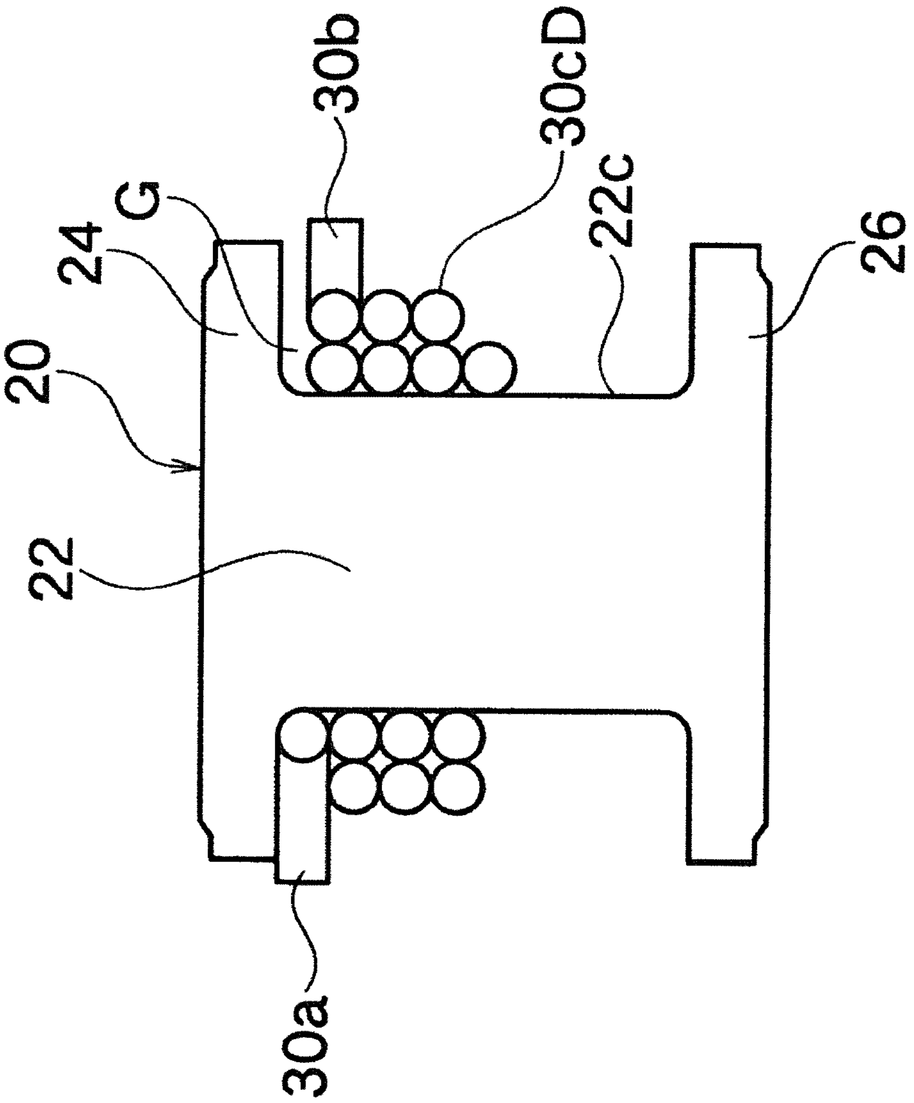
FIG. 6D is a diagram illustrating another modification example of the winding portion illustrated in FIG. 4.

(3) In the example illustrated in FIG. 6C, a winding portion 30*c*C has the winding region 30*c*1 where the number of turns of the wire 30 along the radial direction of the winding core portion 22 is 3 turns, the winding region 30*c*2 where the number of turns of the wire 30 along the radial direction of the winding core portion 22 is 4 turns, and the winding region 30*c*3 where the number of turns of the wire 30 along the radial direction of the winding core portion 22 is 5 turns. The winding region 30*c*1 is formed in 2 turns along the axial direction of the winding core portion 22. The winding region 30*c*2 is formed in 10 turns along the axial direction of the winding core portion 22. The winding region 30*c*3 is formed in 1 to 2 turns along the axial direction of the winding core portion 22. A wire diameter D' of the wire 30 is smaller than the wire diameter D of the wire 30 illustrated in FIG. 6B and so on, and $\frac{1}{3}D<D'<\frac{1}{2}D$ is satisfied. Also in this modification example, the number of turns of the wire along the radial direction of the winding core portion 22 can be increased on one side in the axial direction of the winding core portion 22 and the same effect as that of the above embodiment can be obtained.

Figure 6E:
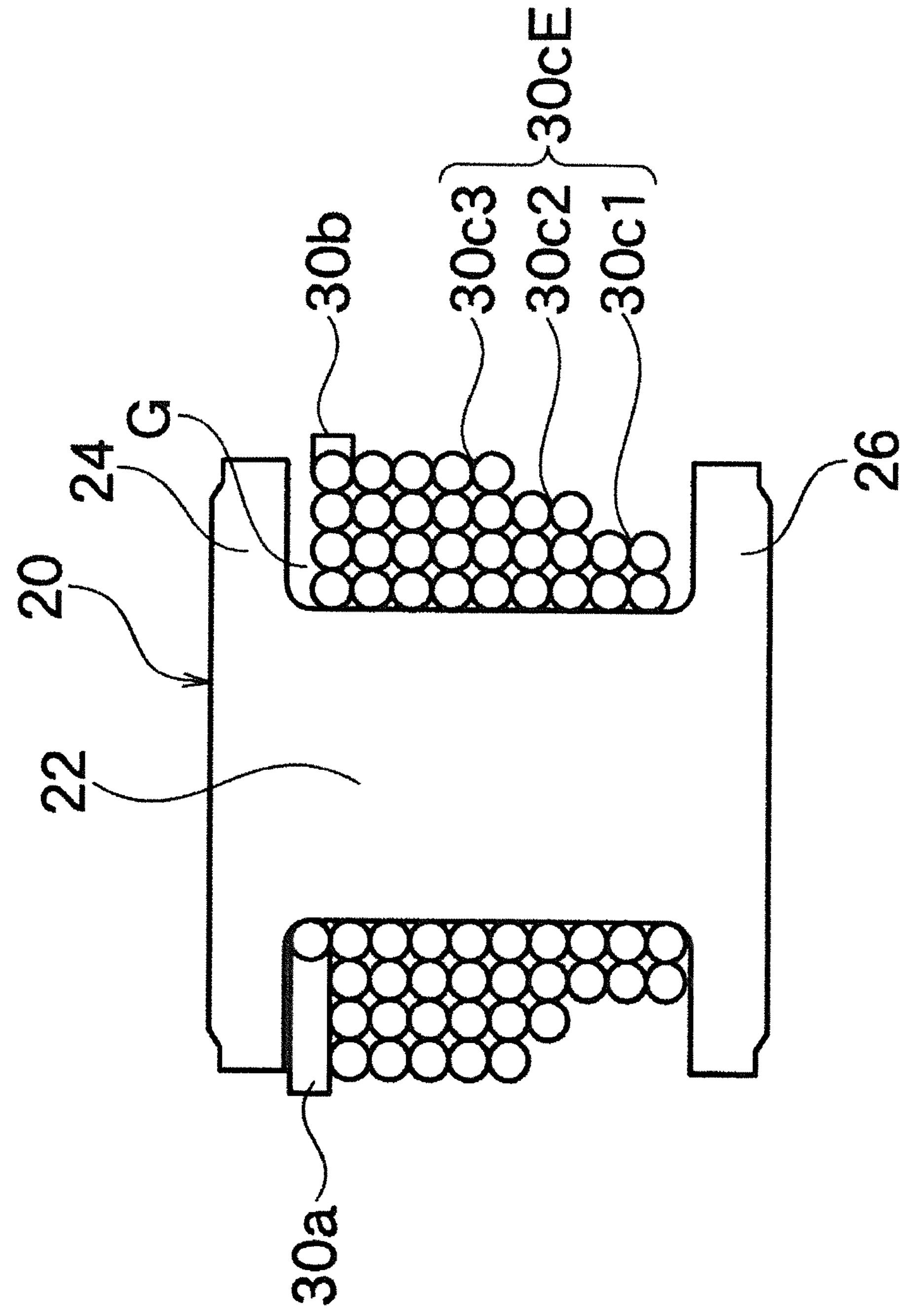
FIG. 6E is a diagram illustrating another modification example of the winding portion illustrated in FIG. 4.

(4) In the example illustrated in FIG. 6E, a winding portion 30*c*E has the winding region 30*c*1 where the number of turns of the wire 30 along the radial direction of the winding core portion 22 is 2 turns, the winding region 30*c*2 where the number of turns of the wire 30 along the radial direction of the winding core portion 22 is 3 turns, and the winding region 30*c*3 where the number of turns of the wire 30 along the radial direction of the winding core portion 22 is 4 turns. The winding region 30*c*1 is formed in 2 to 3 turns along the axial direction of the winding core portion 22. The winding region 30*c*2 is formed in 1 to 2 turns along the axial direction of the winding core portion 22. The winding region 30*c*3 is formed in 5 turns along the axial direction of the winding core portion 22. In this modification example, the winding region 30*c*2 and the winding region 30*c*3 extend to the other side in the axial direction of the winding core portion 22 unlike in the example illustrated in FIG. 4. In other words, the winding region 30*c*2 and the winding region 30*c*3 are formed over a range wider than the winding region 30*c*1 along the axial direction of the winding core portion 22. Also in this modification example, the same effect as that of the above embodiment can be obtained.

Figure 6F:
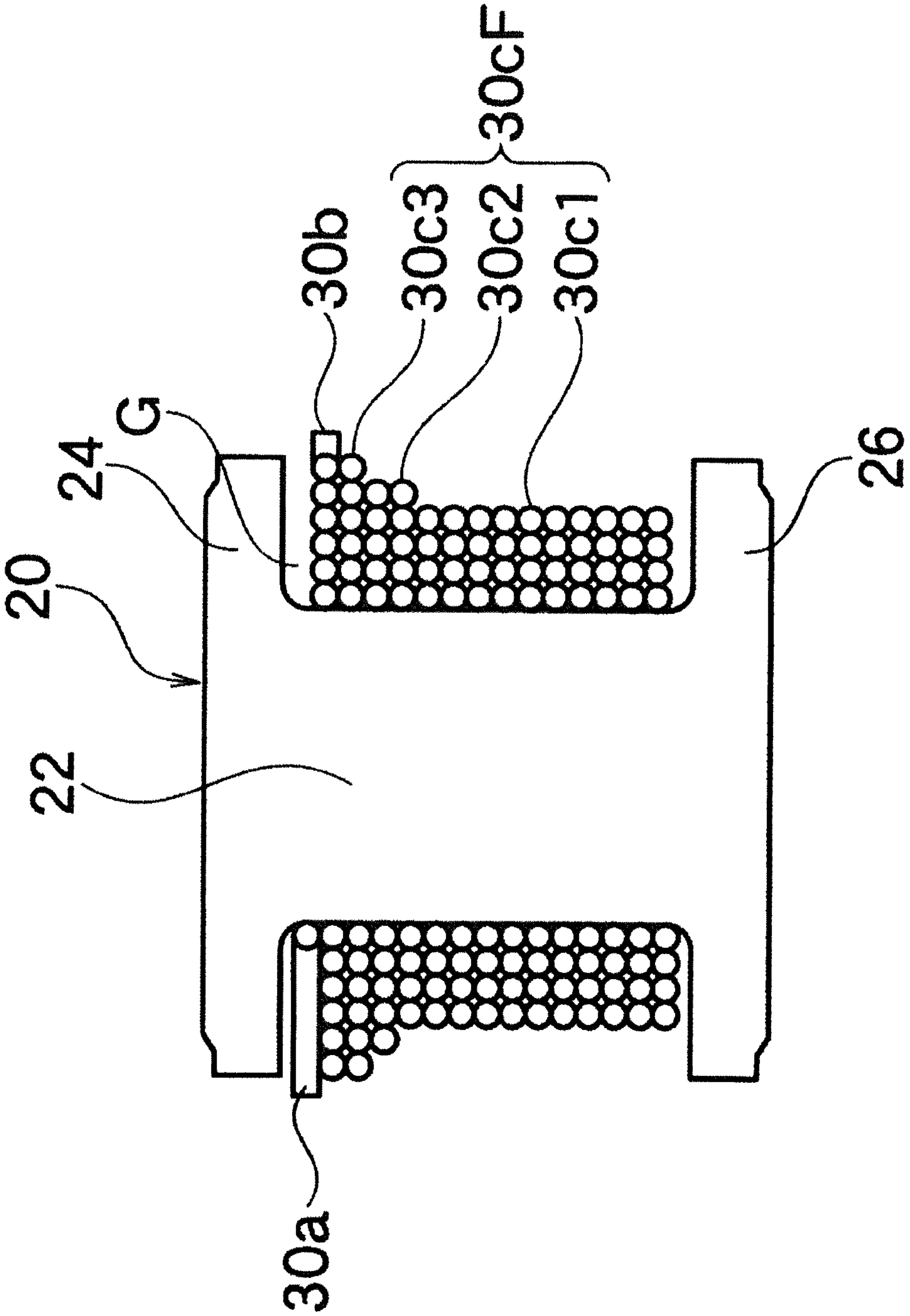
FIG. 6F is a diagram illustrating another modification example of the winding portion illustrated in FIG. 4.

(5) In the example illustrated in FIG. 6F, a winding portion 30*c*F has the winding region 30*c*1 where the number of turns of the wire 30 along the radial direction of the winding core portion 22 is 4 turns, the winding region 30*c*2 where the number of turns of the wire 30 along the radial direction of the winding core portion 22 is 5 turns, and the winding region 30*c*3 where the number of turns of the wire 30 along the radial direction of the winding core portion 22 is 6 turns. The winding region 30*c*1 is formed in 10 to 11 turns along the axial direction of the winding core portion 22. The winding region 30$c$2 is formed in 1 to 2 turns along the axial direction of the winding core portion 22. The winding region 30$c$3 is formed in 2 turns along the axial direction of the winding core portion 22. In this modification example, the ratio of the winding region 30$c$1 to the winding portion 30$c$F is larger than in the example illustrated in FIG. 4. Also in this modification example, the same effect as that of the above embodiment can be obtained effectively.

Figure 6G:
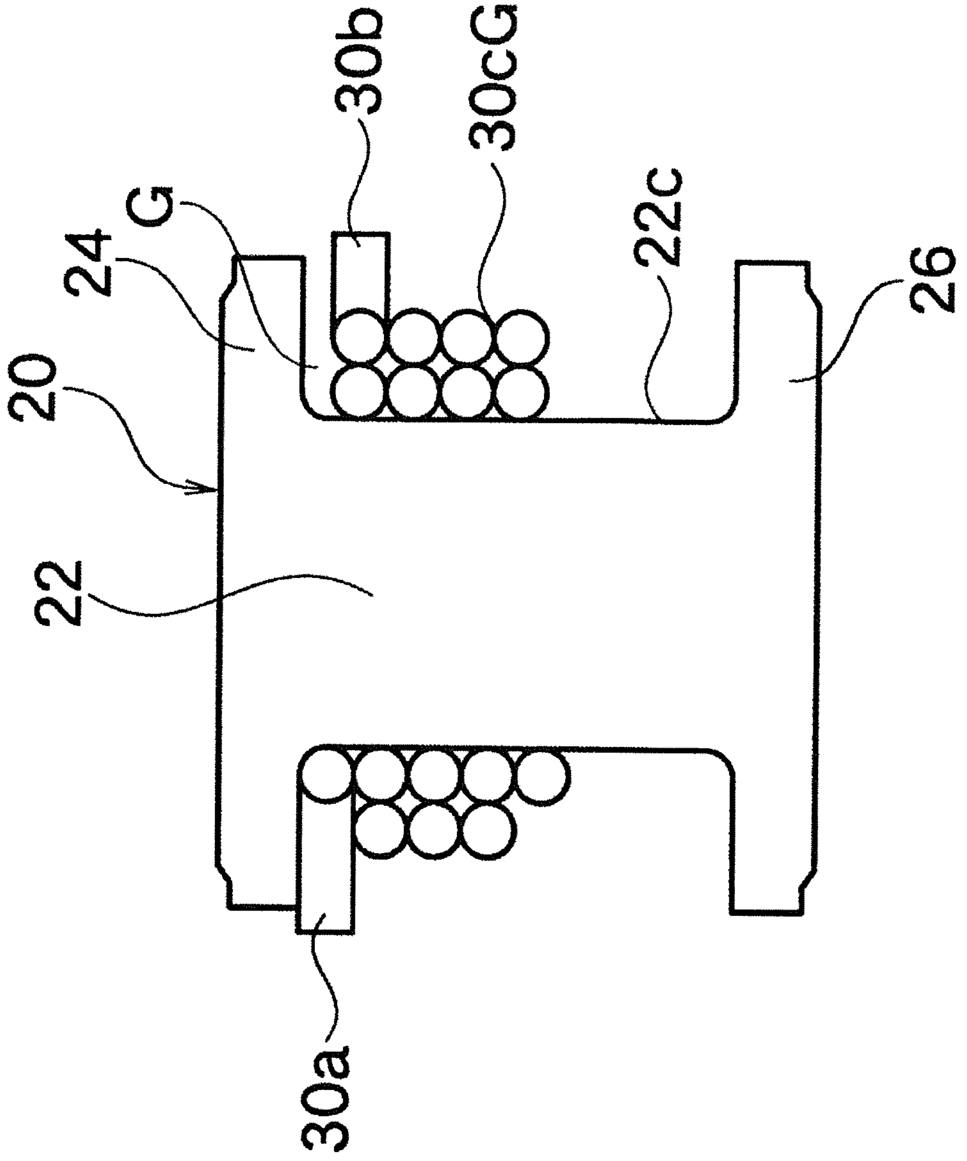
FIG. 6G is a diagram illustrating another modification example of the winding portion illustrated in FIG. 4.

(6) In the example illustrated in FIG. 6G, a winding portion 30$c$G is formed only in the region on one side in the axial direction of the winding core portion 22 and the non-winding portion 22$c$ is formed in the region on the other side in the axial direction of the winding core portion 22. Regarding the axial direction of the winding core portion 22, the range in which the winding portion 30$c$G is formed and the range in which the non-winding portion 22$c$ is formed are substantially equal to each other. Also in this modification example, the same effect as that of the above embodiment can be obtained.

Figure 6H:
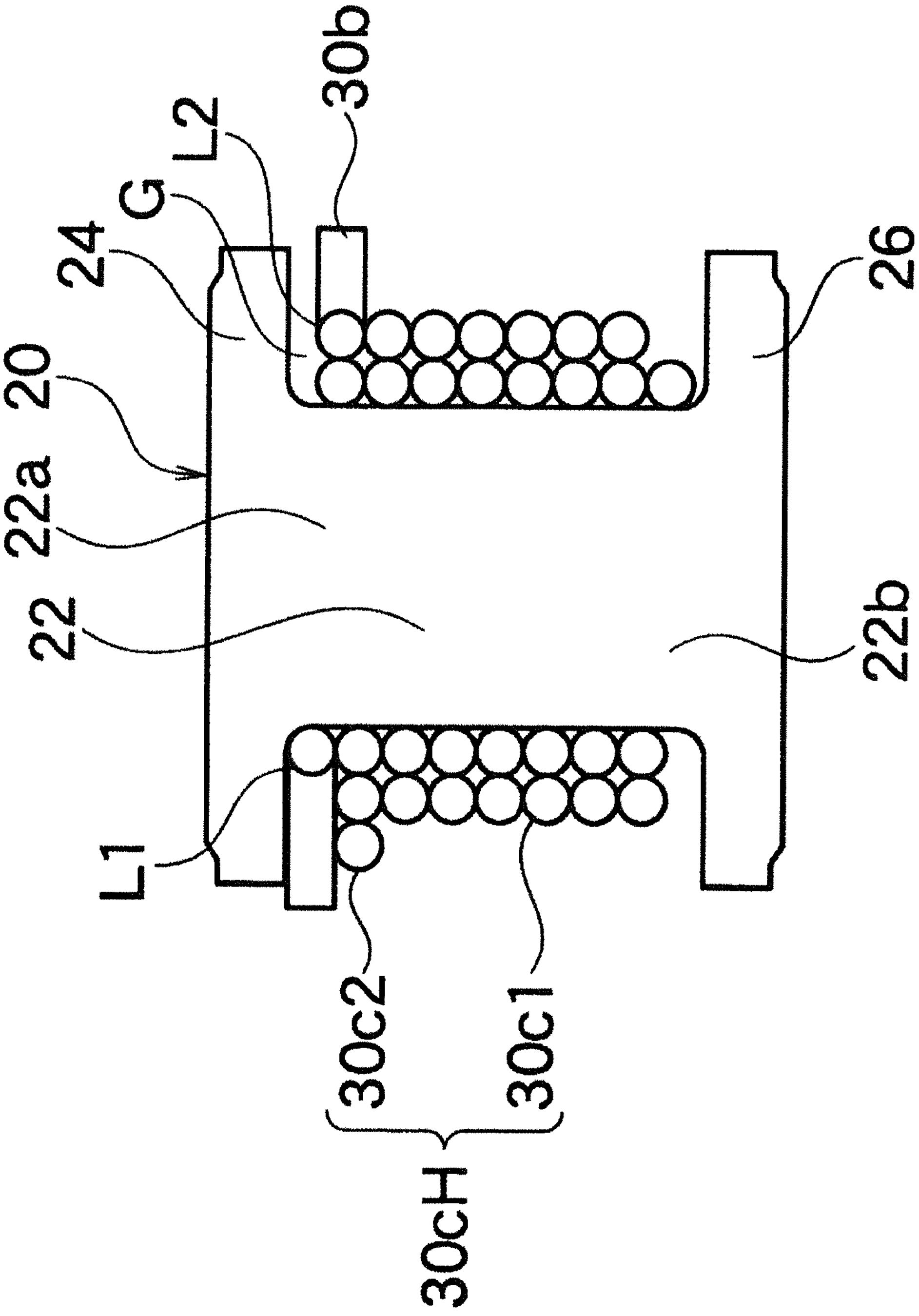
FIG. 6H is a diagram illustrating another modification example of the winding portion illustrated in FIG. 4.

(7) In the example illustrated in FIG. 6H, a winding portion 30$c$H has the winding region 30$c$1 where the number of turns of the wire 30 along the radial direction of the winding core portion 22 is 1 to 2 turns and the winding region 30$c$2 where the number of turns of the wire 30 along the radial direction of the winding core portion 22 is 3 turns. As in this modification example, the number of turns of the wire 30 along the radial direction of the winding core portion 22 may be an odd number of turns (3 turns) in the first end portion 22$a$ of the winding core portion 22. In other words, after the wire 30 is wound toward the other side in the axial direction of the winding core portion 22 and the number of turns of the wire 30 along the radial direction of the winding core portion 22 is 3 turns, the wire 30 does not necessarily have to be wound toward one side in the axial direction of the winding core portion 22 to form the fourth turn. Also in this modification example, the second lead portion 30$b$ can be pulled out toward the second connection portion 64 (FIG. 1B) from the winding end position L2 of the wire 30 in a direction orthogonal to the axial direction of the winding core portion 22 and the same effect as that of the above embodiment can be obtained.

Figure 6I:
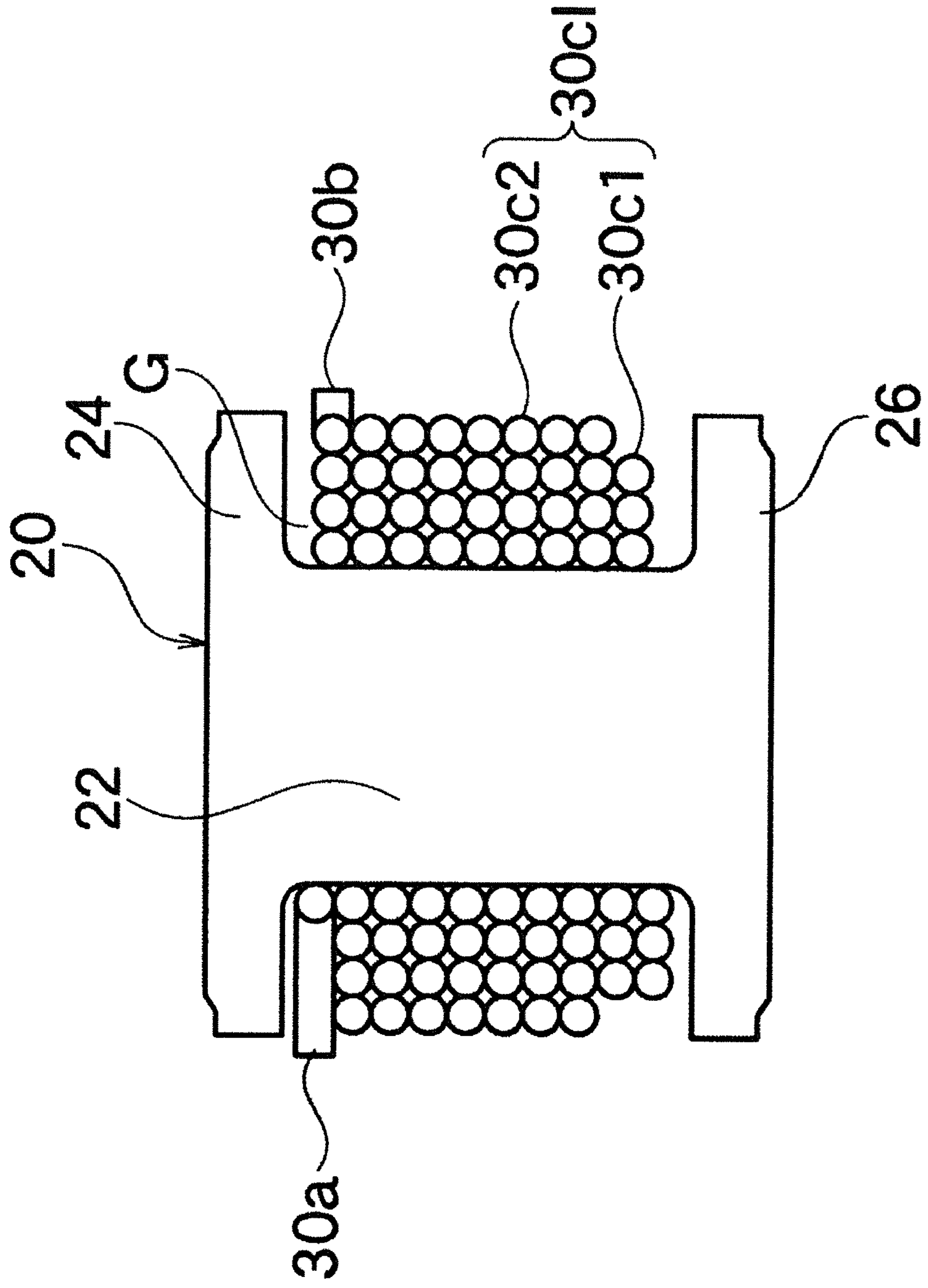
FIG. 6I is a diagram illustrating another modification example of the winding portion illustrated in FIG. 4.

(8) In the example illustrated in FIG. 6I, a winding portion 30$c$1 has the winding region 30$c$1 where the number of turns of the wire 30 along the radial direction of the winding core portion 22 is 3 turns and the winding region 30$c$2 where the number of turns of the wire 30 along the radial direction of the winding core portion 22 is 4 turns. The winding region 30$c$1 is formed in 1 to 2 turns along the axial direction of the winding core portion 22. The winding region 30$c$2 is formed in 7 to 8 turns along the axial direction of the winding core portion 22. Although the total number of turns in the region on one side in the axial direction of the winding core portion 22 is close to the total number of turns in the region on the other side in the axial direction of the winding core portion 22 in the winding portion 30$c$I, the number of turns of the wire 30 along the radial direction of the winding core portion 22 is larger on one side in the axial direction of the winding core portion 22 than on the other side in the axial direction of the winding core portion 22. Accordingly, the same effect as that of the above embodiment can be obtained.

Figure 6J:
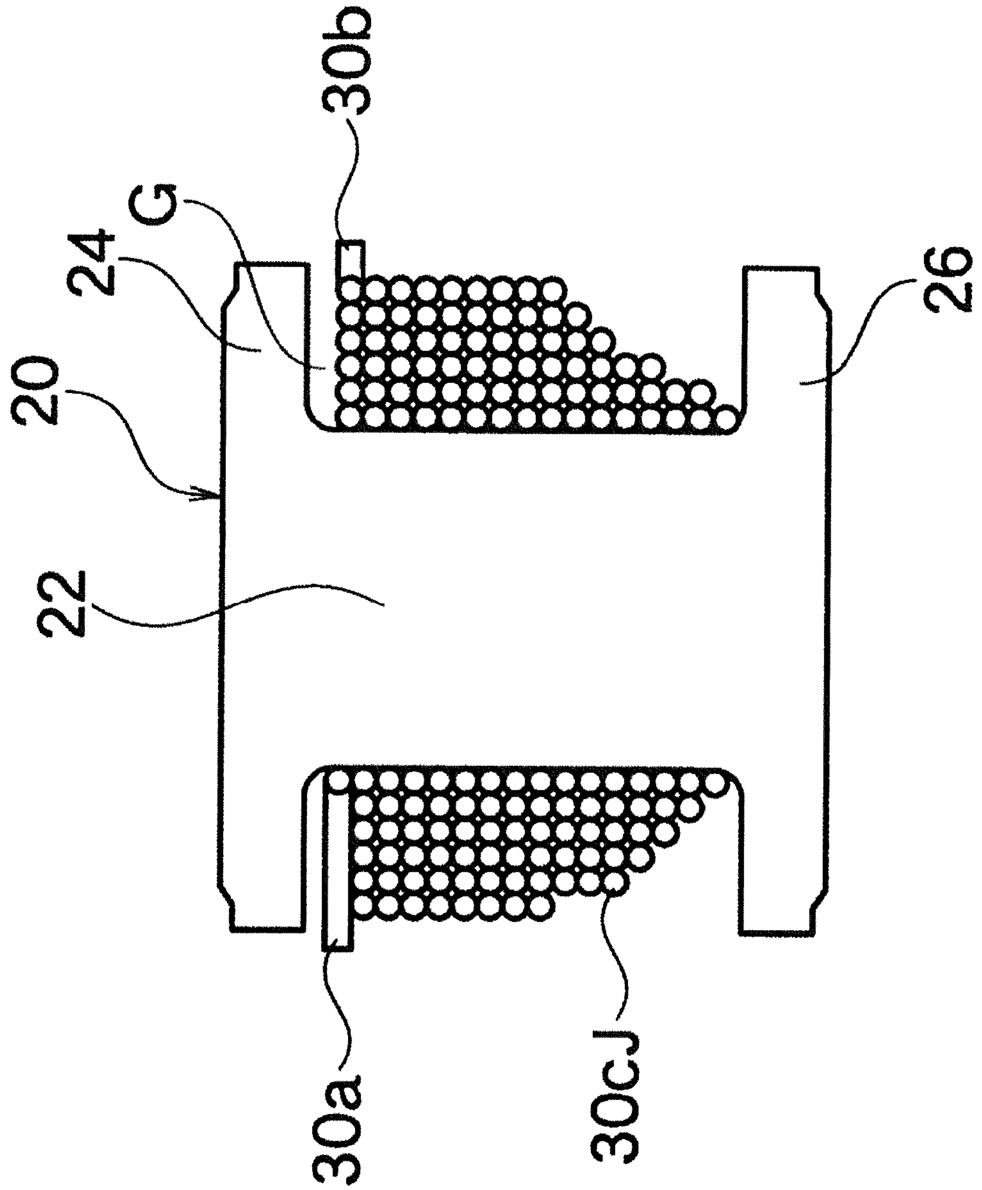
FIG. 6J is a diagram illustrating another modification example of the winding portion illustrated in FIG. 4.

(9) In a winding portion 30$c$J illustrated in FIG. 6J, the number of turns of the wire 30 along the radial direction of the winding core portion 22 gradually increases in the order of 1 turn 2 turns 4 turns 5 turns on the other side in the axial direction of the winding core portion 22 whereas the number of turns of the wire 30 along the radial direction of the winding core portion 22 is a constant value (6 turns) on one side in the axial direction of the winding core portion 22. Also in this modification example, the number of turns of the wire 30 along the radial direction of the winding core portion 22 is larger on one side in the axial direction of the winding core portion 22 than on the other side in the axial direction of the winding core portion 22 and the same effect as that of the above embodiment can be obtained.

Figure 6K:
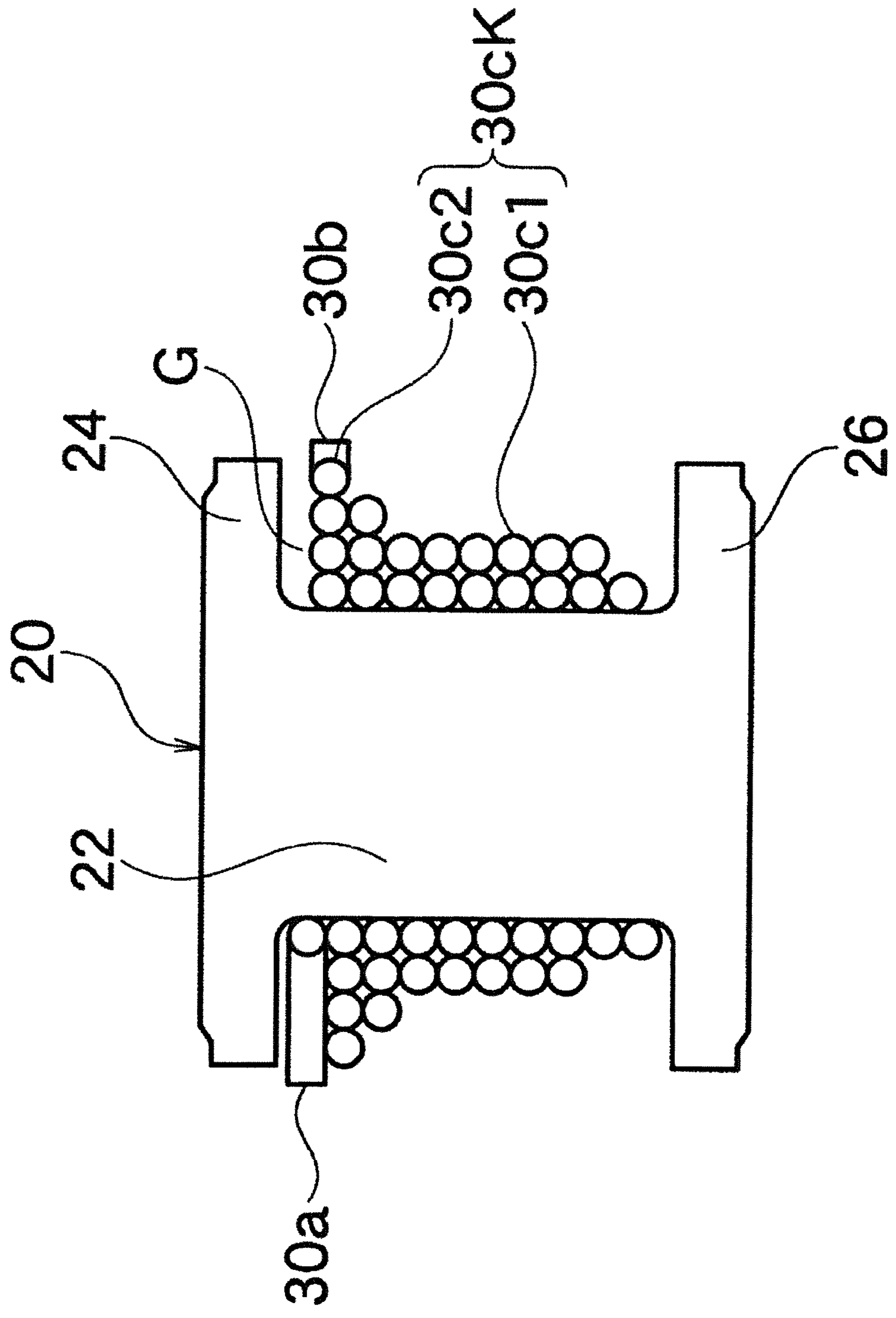
FIG. 6K is a diagram illustrating another modification example of the winding portion illustrated in FIG. 4.

(10) In the example illustrated in FIG. 6K, a winding portion 30$c$K has the winding region 30$c$1 where the number of turns of the wire 30 along the radial direction of the winding core portion 22 is 1 to 2 turns and the winding region 30$c$2 where the number of turns of the wire 30 along the radial direction of the winding core portion 22 is 3 to 4 turns. The winding region 30$c$1 is formed in 7 turns along the axial direction of the winding core portion 22. The winding region 30$c$2 is formed in 2 turns along the axial direction of the winding core portion 22. Also in this modification example, the winding region 30$c$2 is formed in a narrower region in the axial direction in the first end portion 22$a$ of the winding core portion 22 as in Modification Example (5) and the same effect as that of Modification Example (5) can be obtained.

Figure 6L:
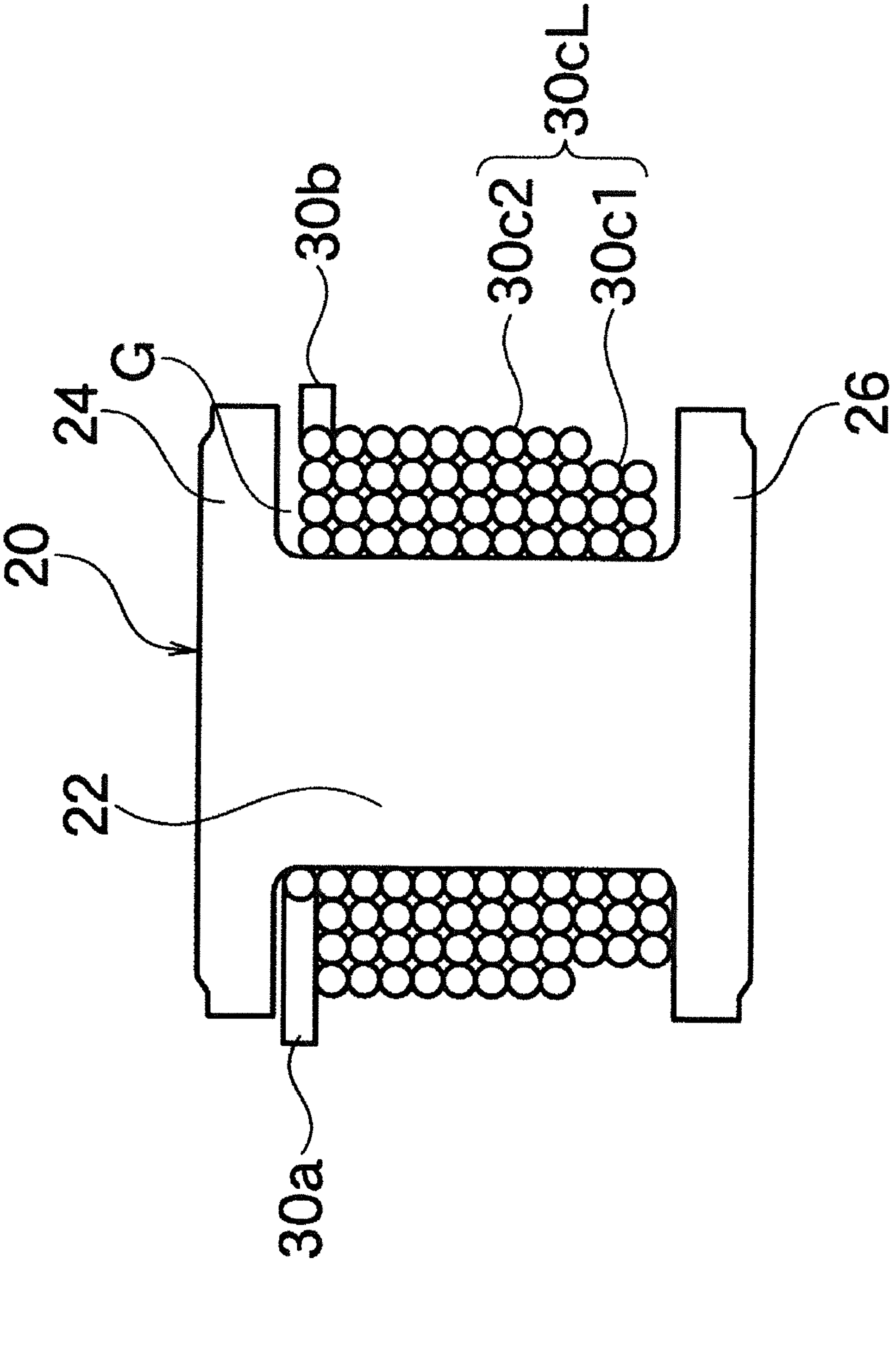
FIG. 6L is a diagram illustrating another modification example of the winding portion illustrated in FIG. 4.

(11) In the example illustrated in FIG. 6L, a winding portion 30$c$L has the winding region 30$c$1 where the number of turns of the wire 30 along the radial direction of the winding core portion 22 is 3 turns and the winding region 30$c$2 where the number of turns of the wire 30 along the radial direction of the winding core portion 22 is 4 turns. The winding region 30$c$1 is formed in 2 to 3 turns along the axial direction of the winding core portion 22. The winding region 30$c$2 is formed in 8 to 9 turns along the axial direction of the winding core portion 22. The shape of the winding portion 30$c$L is similar to that of the winding portion 30$c$1 illustrated in Modification Example (8), and the same effect as that of Modification Example (8) can be obtained also in this modification example. In addition, in this modification example, the number of turns of the wire 30 as a whole is larger than in Modification Example (8) and the coil device 10 that is satisfactory in terms of inductance characteristics can be realized.

(12) Although an example of application of the present invention to an inductor is illustrated in the above embodiment, the present invention may be applied to a coil device other than the inductor.

(13) In the above embodiment, the cross-sectional shape of the winding core portion 22, the upper flange portion 24, or the lower flange portion 26 may be an ellipse, a polygon, or the like.

EXPLANATIONS OF LETTERS OR NUMERALS

10 COIL DEVICE
20 INNER CORE
22 WINDING CORE PORTION
22$a$ FIRST END PORTION
22$b$ SECOND END PORTION
22$c$ NON-WINDING PORTION
24 UPPER FLANGE PORTION
24$b$ INNER SURFACE
26 LOWER FLANGE PORTION
26$b$ INNER SURFACE
30 WIRE
30$a$ FIRST LEAD PORTION
30$b$ SECOND LEAD PORTION
30$c$ WINDING PORTION
40 OUTER CORE

40*a* INSERTION HOLE
50 FIRST TERMINAL PORTION
52 FIRST FIXED PORTION
54 FIRST CONNECTION PORTION
56 FIRST CONNECTING PORTION
60 SECOND TERMINAL PORTION
62 SECOND FIXED PORTION
64 SECOND CONNECTION PORTION
66 SECOND CONNECTING PORTION
70 ADHESIVE-HARDENED PORTION
80 WINDING MACHINE
81 FIRST ROTATING BODY
81*a* FIXING PORTION
82 SECOND ROTATING BODY
82*a* FIXING PORTION
83 NOZZLE
84 POSITION ADJUSTING UNIT

What is claimed is:

1. A coil device comprising:

an inner core including a winding core portion wound by a wire, a first flange portion provided on one side in an axial direction of the winding core portion, and a second flange portion provided on another side in the axial direction of the winding core portion;

an outer core having an insertion hole and disposed outside the inner core, the inner core being inserted to the insertion hole; and a pair of terminal portions provided on the outer core, lead portions of the wire being respectively connected to the terminal portions, wherein the number of turns of the wire along a radial direction of the winding core portion is larger on the one side in the axial direction of the winding core portion than on the other side in the axial direction of the winding core portion, a winding end position of the wire is positioned at a first end portion of the winding core portion on the one side in the axial direction of the winding core portion together with a winding start position of the wire, the first end portion is an area including (i) an intersection of the winding core portion and the first flange portion and (ii) a portion around the intersection, and the winding end position of the wire is positioned closer to the other side in the axial direction of the winding core portion than the winding start position of the wire within a region of the first end portion.

2. The coil device according to claim 1, wherein the wire is wound in two or more turns along the radial direction of the winding core portion from the one side to the other side in the axial direction of the winding core portion, and the wire is wound in three or more turns along the radial direction of the winding core portion on the one side in the axial direction of the winding core portion.

3. The coil device according to claim 1, wherein the wire is wound in two or more turns along the radial direction of the winding core portion from the one side to the other side in the axial direction of the winding core portion, and the wire is not wound around a second end portion of the winding core portion.

4. The coil device according to claim 1, wherein the wire is wound in two or more turns along the radial direction of the winding core portion from the one side to the other side in the axial direction of the winding core portion, and the wire is not wound around a second end portion of the winding core portion.

5. The coil device according to claim 1, wherein the wire is started to be wound around the first end portion of the winding core portion at a position adjacent to an inner surface of the first flange portion.

6. The coil device according to claim 1, wherein an outer peripheral surface of the first flange portion is joined to an inner peripheral surface of the outer core with a resin, and a gap is formed between an outer peripheral surface of the second flange portion and the inner peripheral surface of the outer core.

7. The coil device according to claim 1, wherein the wire is comprised of a single wire.

8. The coil device according to claim 7, wherein the inner core is configured such that the axial direction of the winding core portion is perpendicular to a mounting substrate.

9. The coil device according to claim 1, wherein a gap is formed between an inner surface of the first flange portion and the wire at the winding end position.

10. The coil device according to claim 9, wherein the gap is equal to or greater than half a diameter of the wire within the region of the first end portion, or the gap is equal to or greater than the diameter of the wire within the region of the first end portion.

11. The coil device according to claim 1, wherein the first end portion is the area between (i) the intersection of the winding core portion and the first flange portion and (ii) a position spaced apart from the intersection by a distance of three times a diameter of the wire along the axial direction.

* * * * *